United States Patent [19]

Atobe et al.

[11] Patent Number: 5,051,601

[45] Date of Patent: Sep. 24, 1991

[54] ELECTRONIC APPARATUS WITH LIGHT COMMUNICATION

[75] Inventors: Hiroshi Atobe, Yokohama; Akio Noguchi, Ebina; Yukihide Ushio, Tokyo; Yoji Serizawa, Yokohama; Seiji Uchiyama, Tokyo; Kazuro Yamada; Makoto Takeuchi, both of Yokohama, all of Japan

[73] Assignee: Canon Kabushiki Kaisha, Tokyo, Japan

[21] Appl. No.: 395,060

[22] Filed: Aug. 17, 1989

[30] Foreign Application Priority Data

Aug. 23, 1988 [JP] Japan .................................. 63-207357
Jul. 25, 1989 [JP] Japan .................................. 1-193100

[51] Int. Cl.[5] ............................................. G02B 27/00
[52] U.S. Cl. ................................... 250/551; 359/152; 359/154
[58] Field of Search ............... 250/551, 239, 229, 561, 250/221, 222.1; 455/600, 602

[56] References Cited

U.S. PATENT DOCUMENTS

| | | | |
|---|---|---|---|
| 4,393,515 | 7/1983 | de Neumann | 455/602 |
| 4,612,670 | 9/1986 | Henderson | 250/551 |
| 4,695,714 | 9/1987 | Kimizuka et al. | 250/205 |
| 4,712,118 | 12/1987 | Seto et al. | 346/108 |
| 4,733,093 | 3/1988 | Graves et al. | 250/551 |
| 4,761,662 | 8/1988 | Yoshimoto et al. | 346/108 |
| 4,777,359 | 10/1988 | Havel | 250/239 |
| 4,841,283 | 6/1989 | Bubliewicz | 250/222.1 |
| 4,868,543 | 9/1989 | Binkley | 250/222.1 |
| 4,873,431 | 10/1989 | Ito | 250/551 |
| 4,928,094 | 5/1990 | Smith | 250/221 |

Primary Examiner—David C. Nelms
Assistant Examiner—K. Shami
Attorney, Agent, or Firm—Fitzpatrick, Cella, Harper & Scinto

[57] ABSTRACT

There is disclosed an electronic apparatus in which signal transmission, for example a command signal from a control unit or a detection signal from a detector, is conducted by light from an emitting unit to a receiving unit. This eliminates signal transmission by cables, thus avoiding complicated wiring operations, preventing noises and reducing the volume of the apparatus.

49 Claims, 21 Drawing Sheets

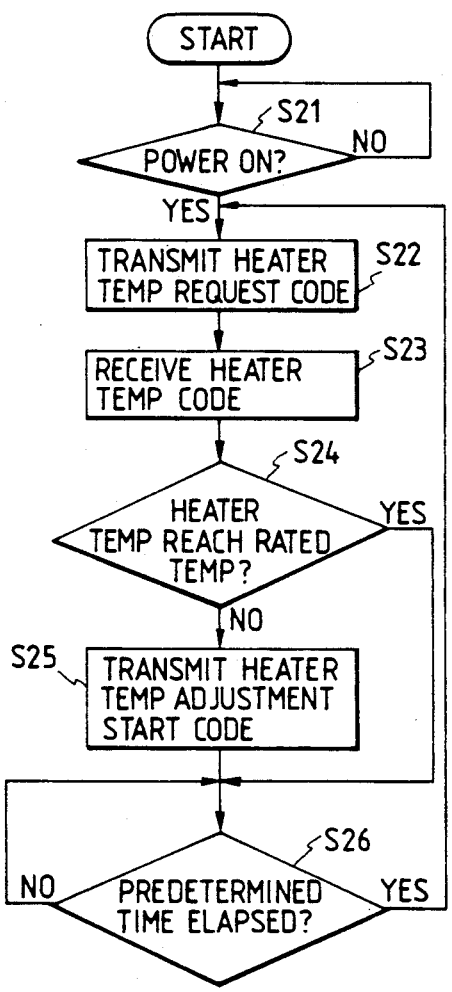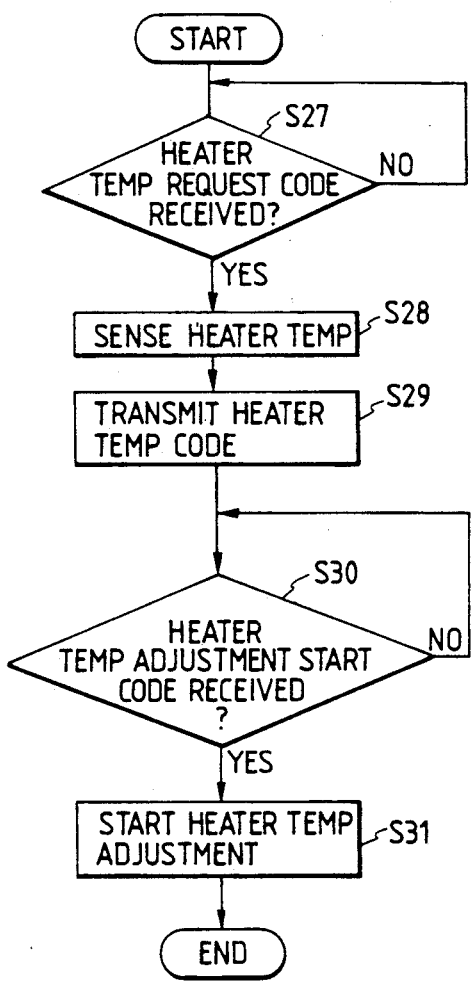

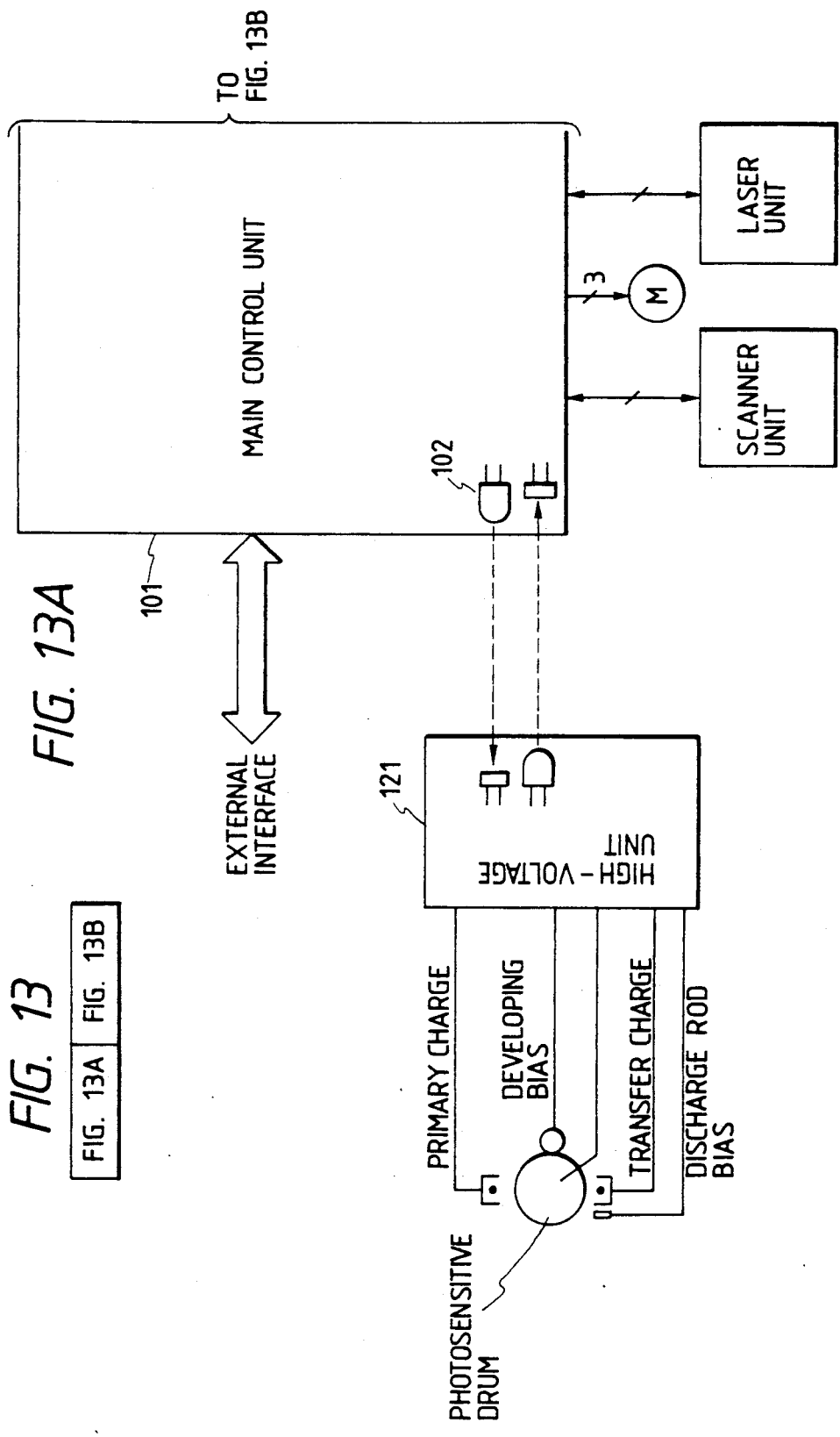

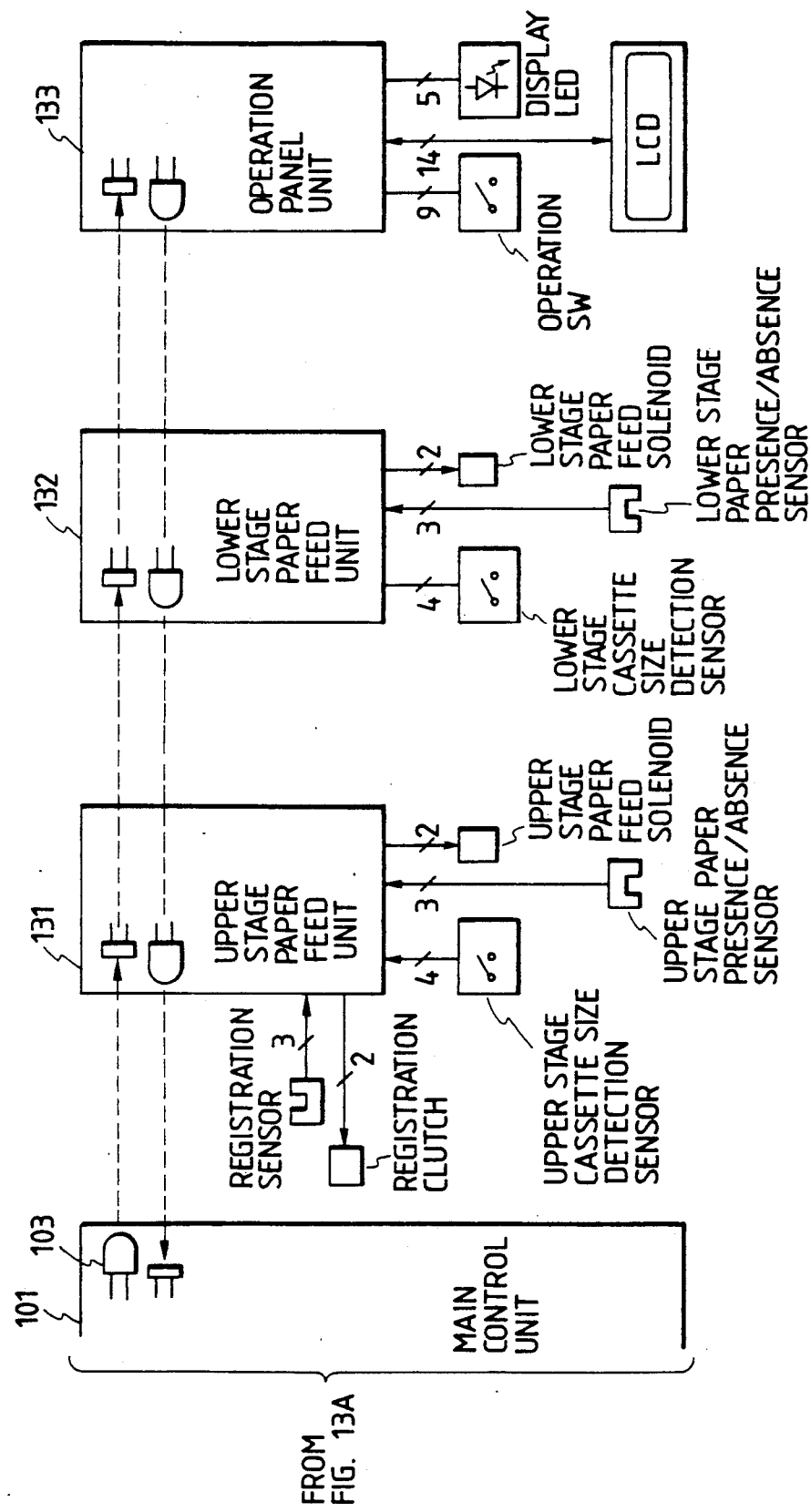

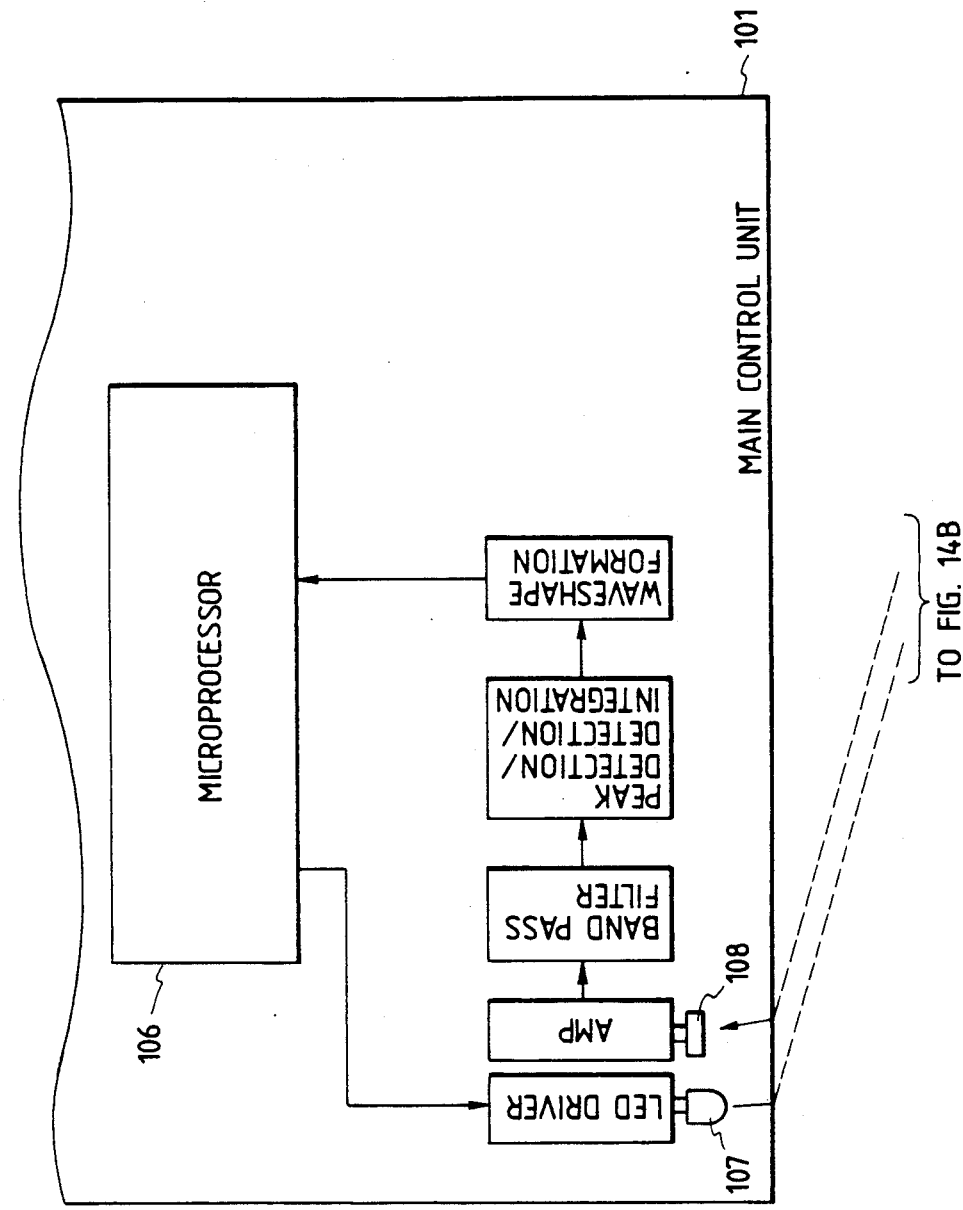

ELECTRONIC APPARATUS WITH LIGHT COMMUNICATION

BACKGROUND OF THE INVENTION

1. Field of the Invention

The present invention relates to an electronic apparatus with internal communication of information.

2. Related Background Art

In conventional electronic apparatus, the connection of various units and components has been made by wires or cables. Consequently, with the increase in the number of units or components in the apparatus, such wires or cables occupy a considerable space within the electronic apparatus, thus increasing the volume thereof.

Also the paths of such wires or cables are not constant, the electric properties, such as noise characteristics, inevitably fluctuate among the apparatuses.

In summary, the connections with wires or cables in the conventional apparatus give rise to following drawbacks:

(1) a large number of work steps, such as wire binding, stamping, screwing, soldering etc. unsuitable for mass production;

(2) noise generation;

(3) possible erroneous connections leading to malfunctions; and (4) a large volume required for the wires or cables, leading to a large dimension of the apparatus.

SUMMARY OF THE INVENTION

An object of the present invention is to eliminate the drawbacks of the prior technology, for example simplifying the assembling work such as wire soldering.

Another object of the present invention is to reduce the influence of noises, thereby providing an electronic apparatus of high realiability.

Still another object of the present invention is to compactize the electronic apparatus by reducing the space required for installation of wires.

Still another object of the present invention is to provide an electronic apparatus capable of effecting communication even in the presence of an obstacle by the use of a reflector.

Still another object of the present invention is to provide an electronic apparatus of which function is disabled by opening a part of the casing thereof, thereby enabling maintenance or repair work.

Still another object of the present invention is to provide an improved structure for detecting the opening of a part of the casing thereof.

Still other objects of the present invention, and the advantages thereof, will become fully apparent from the following description of the embodiments thereof.

BRIEF DESCRIPTION OF THE DRAWINGS

FIGS. 11 to 12 are flow charts showing the control sequence of said second embodiment;

FIGS. 13, 13A, and 13B are a block diagram of a third embodiment;

FIGS. 14, 14A, and 14B are a block diagram of a main control unit and another unit;

DETAILED DESCRIPTION OF THE PREFERRED EMBODIMENTS

1st Embodiment

As an example of the electronic apparatus, there will be explained an embodiment in which the present invention is applied to a laser beam printer. In said apparatus the electric wirings among various units are replaced by communication with light. More specifically, each unit is equipped with a light-emitting diode for emitting a light signal based on modulated device information, and a phototransistor for receiving the light signal from the light-emitting diode, and is adapted to demodulate the received light signal.

In the following explained is the first embodiment of the present invention, with reference to the attached drawings.

The present embodiment is composed of a laser beam printer, and there will be explained individual functions in the print sequence thereof.

Figure 1:
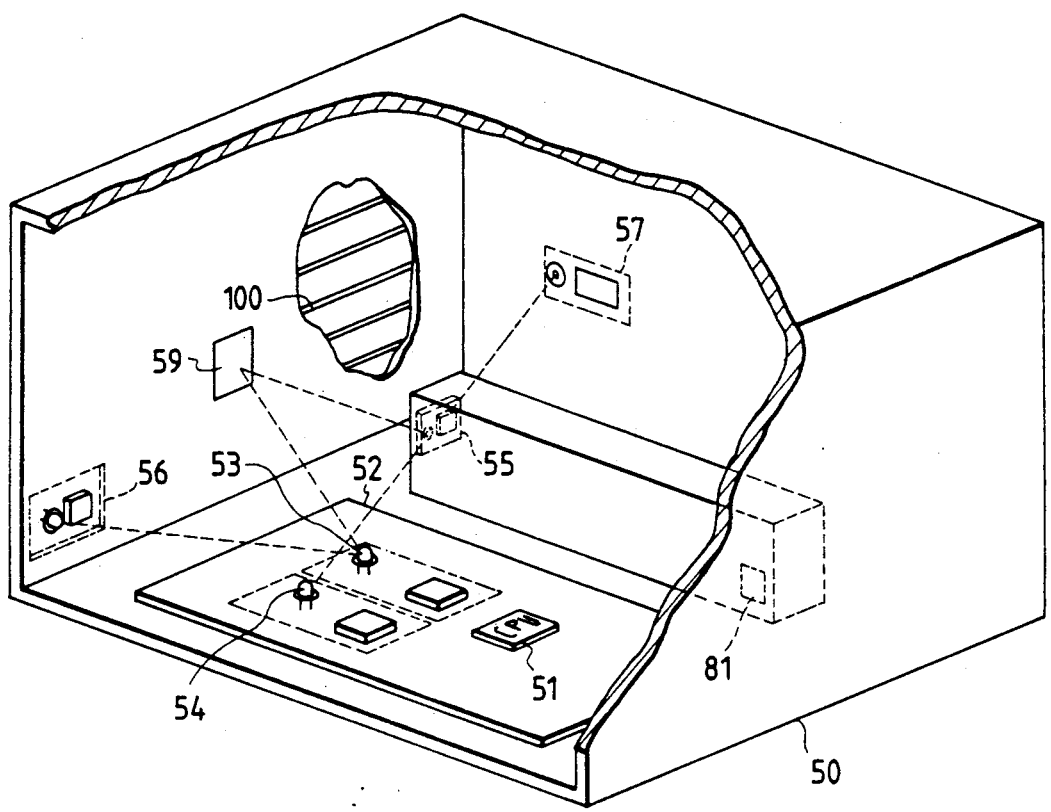
FIG. 1 is a partially cut-off perspective view of a first embodiment of the present invention.
Figure 2:
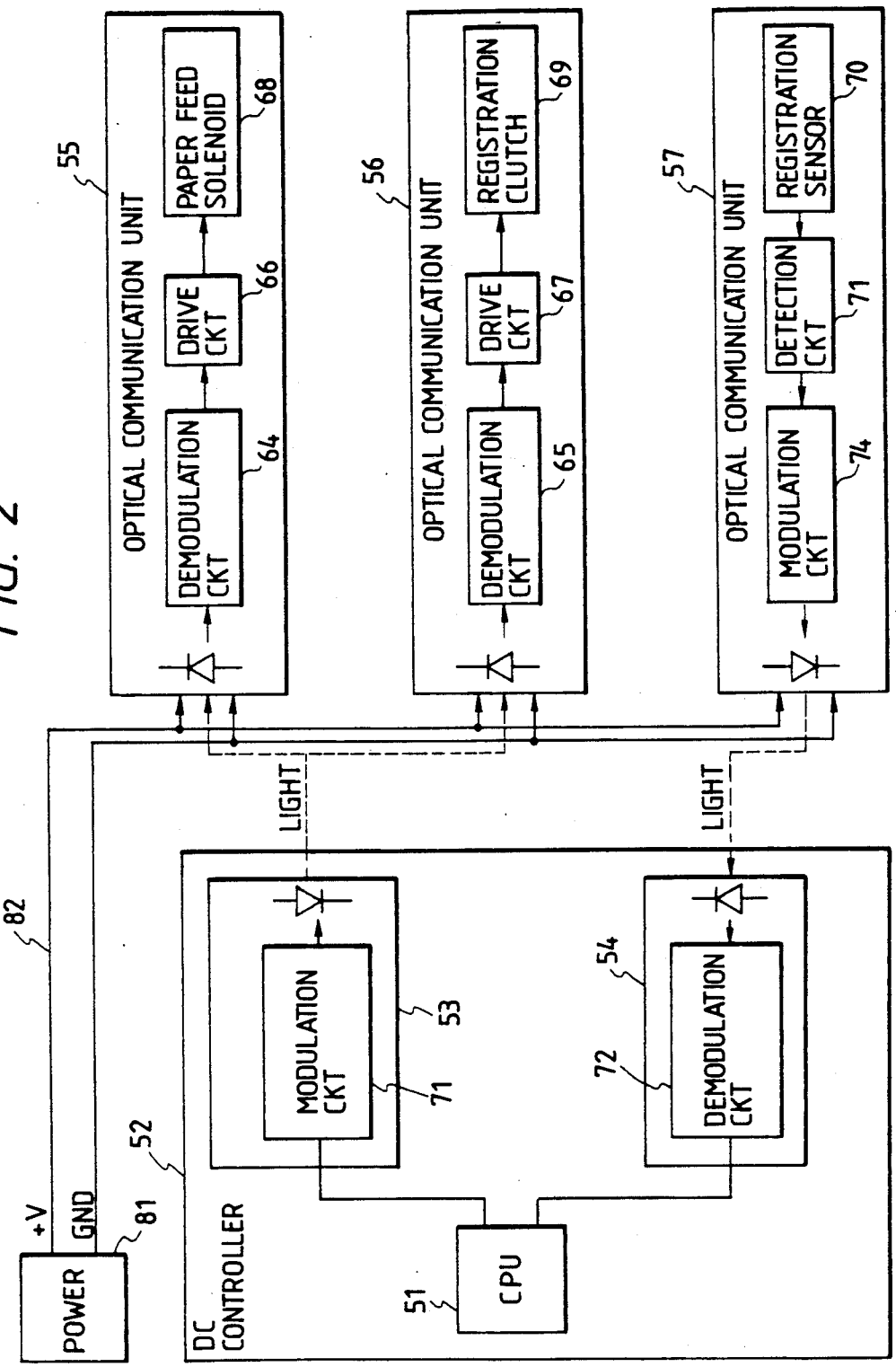
FIG. 2 is a block diagram of said first embodiment.

Structure of Apparatus (FIGS. 1 and 2)

FIG. 1 is a schematic view of the interior of a laser beam printer, constituting the first embodiment of the present invention. The structure of a copying machine is same as that shown in FIG. 1. In FIG. 1 there are shown a casing 50 made of a plastic or metal material; a CPU 51; a DC controller board 52; an optical communication unit 53 containing a light-emitting diode (LED); an optical communication unit 54 containing a photodiode; optical communication units 55, 56 each containing a photosensor and a demodulating device and respectively connected to a sheet feeding solenoid and a sheet transporting motor; an optical communication unit 57 containing a light-emitting device and a modulating device, and connected with a photosensor for informing the optical communication unit 54 on the DC controller with the state of sheet transportation in a sheet transporting unit; cables or wires 100 used for grounding or power supply and embedded in the casing; a mirror or a reflector 59 composed of a polished part of the casing, for forming a light path between optical communication units which cannot communicate each other directly; and a power source 81.

In the present embodiment, the function of the printer is controlled by the CPU 51 on the DC controller board 52. For example the function of the sheet feeding unit, for sheet feeding in the printer, is controlled by the CPU 51. The commands of the CPU 51 are transmitted by the optical communication unit 53 composed of a light-emitting device, such as an LED, and a modulating device.

The command transmitted by the optical communication unit 53 is received the optical communication units 55, 56, each composed of a light receiving device such as a photosensor and a demodulating device, and said units respectively drive the sheet feeding solenoid and the sheet transporting motor according to thus received information.

In this manner the various commands in the printer are transmitted by optical communication from the optical communication unit 53 on the DC controller board to those 55, 56 of various functional units, instead of conventional wirings in the printer.

Also the modulating circuit and the demodulating circuit employed in the above-mentioned optical communication units can be compactized as integrated circuits, by employing suitable modulating and demodulating methods such as intermittent light emission of 1 KHz for a signal "0" and that of 3 KHz for a signal "1".

FIG. 2 is a block diagram of the DC controller, modulating and demodulating units. The CPU 51 controls the driving systems, such as the rotation of sheet feeding roller. Power supply lines 82, for power supply to the DC controller and the optical communication units, are embedded in the casing. Each of the optical communication units 55, 56 receives the code data addressed to it among the commands emitted from the optical communication unit 53 of the DC controller, and in response to the received light signals, drive circuits 66, 67 respectively drive a sheet feeding solenoid 68 and a registration clutch 69.

A registration sensor 70 in the optical communication unit 57 informs a detection circuit 71 of the presence or absence of a sheet. In the presence of sheet, the detection circuit 71 transmits a signal to a modulation circuit 74, thereby effecting optical communication to a demodulation unit 54 of the DC controller.

Figure 3:
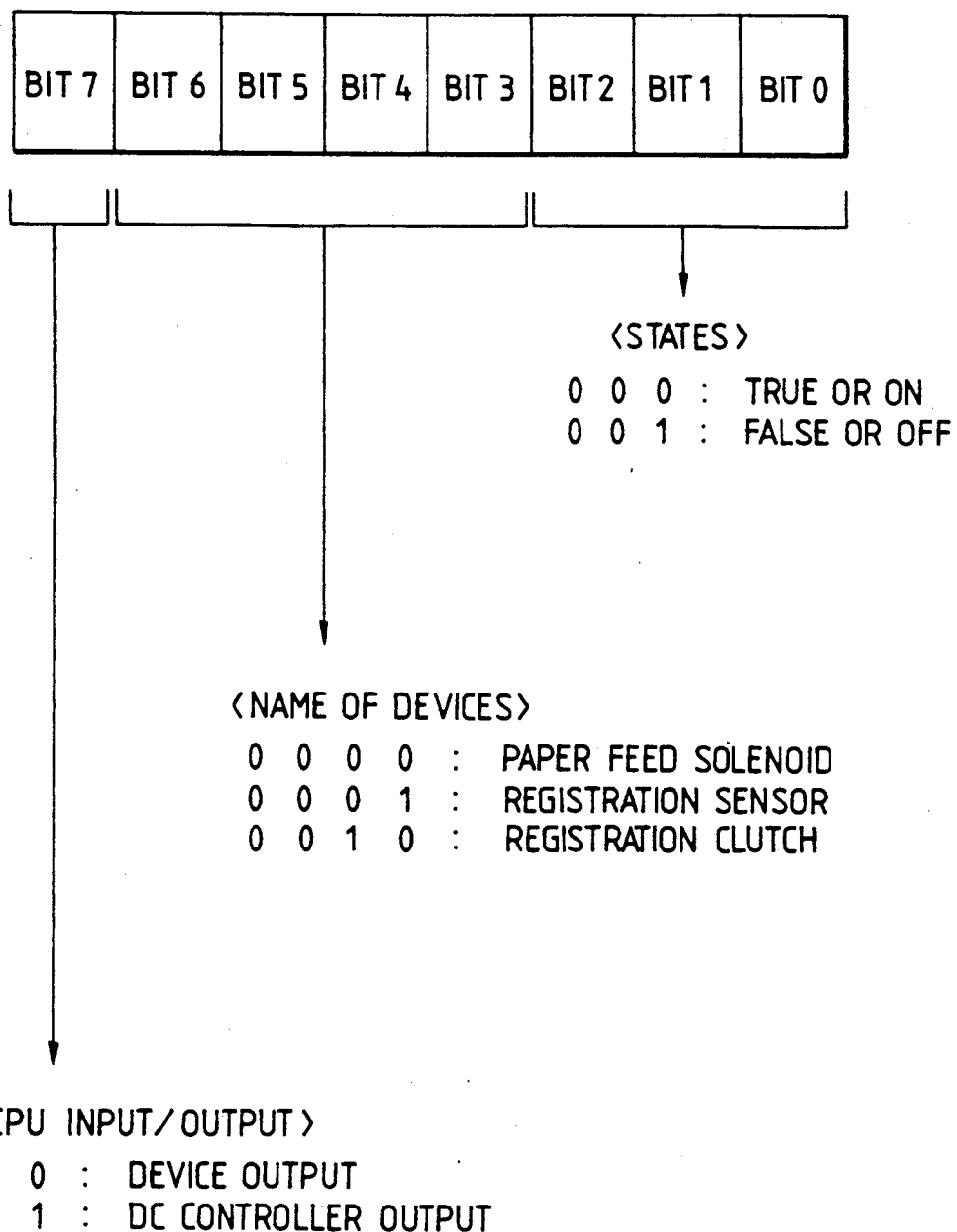
FIG. 3 is a chart showing the structure of communication data of said first embodiment.

Communication Code (FIG. 3)

FIG. 3 shows an example of the structure of the code used in communication among optical communication units. The communication between the optical communication unit 53 or 54 controlled by the CPU 51 and another optical communication unit is conducted with an 8-bit code shown in FIG. 3. In practice, the reliability of communication can be further improved by adding a parity bit to said 8-bit code, and further adding a start bit and a stop bit. In FIG. 3, a bit 7 indicates whether the information is input to or output from the CPU 51, and is "1" in case the CPU 51 sends a code to the optical communication units 55, 56, or "0" in case the CPU 51 receives a code from the unit 57. Bits 6 to 3 represent codes identifying the devices corresponding to the optical communication units 55–57. For example the unit 55 for driving the sheet feeding solenoid 68 is represented by a code "0000", the unit 57 for detecting the state of the registration sensor is represented by "0001", and the unit 58 for driving the registration clutch is represented by "0010". Bits 2 to 0 represent for example the presence or absence of sheet in a sheet cassette, or represent commands for driving the sheet feeding solenoid or the registration clutch. In the present embodiment, "000" indicates "true" (sheet present) or "on", and "001" indicates "false" (sheet absent) or "off".

Functions (FIGS. 4 to 8)

In the following explained is the communication among various units, with reference to flow charts shown in FIGS. 4 to 7.

Figure 8:
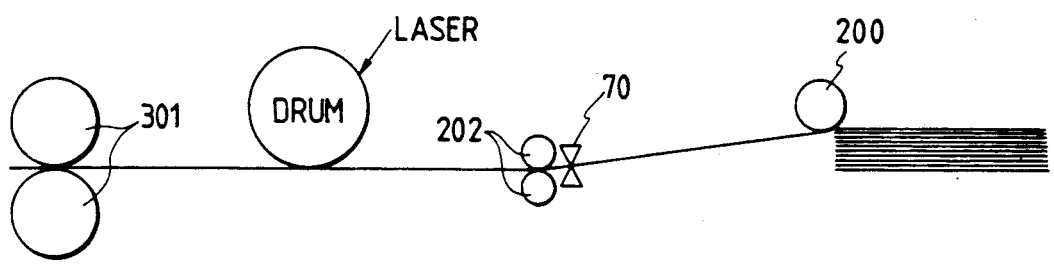
FIG. 8 is a schematic view of said first embodiment.
Figure 4:
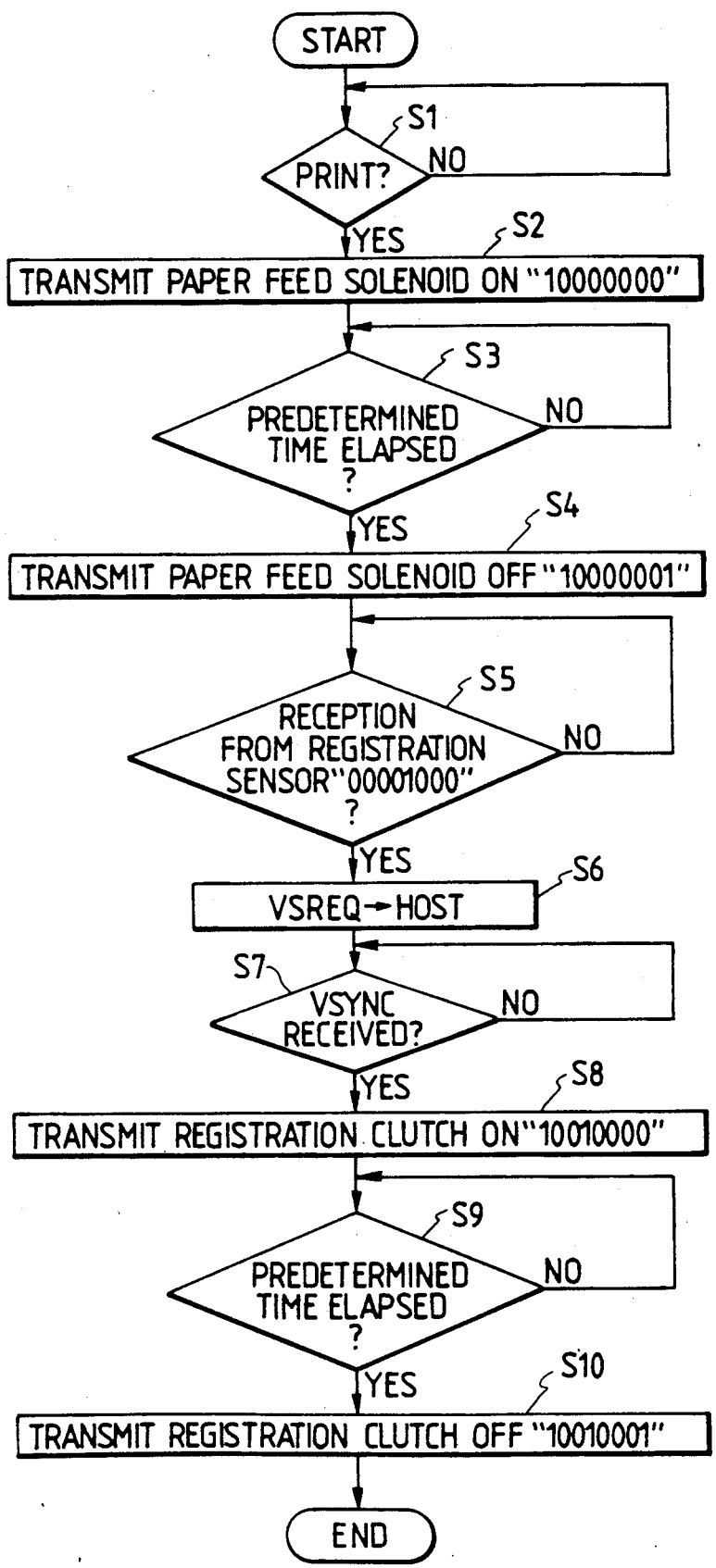
FIGS. 4 to 7 are flow charts showing the control sequence of said first embodiment.
Figure 5:
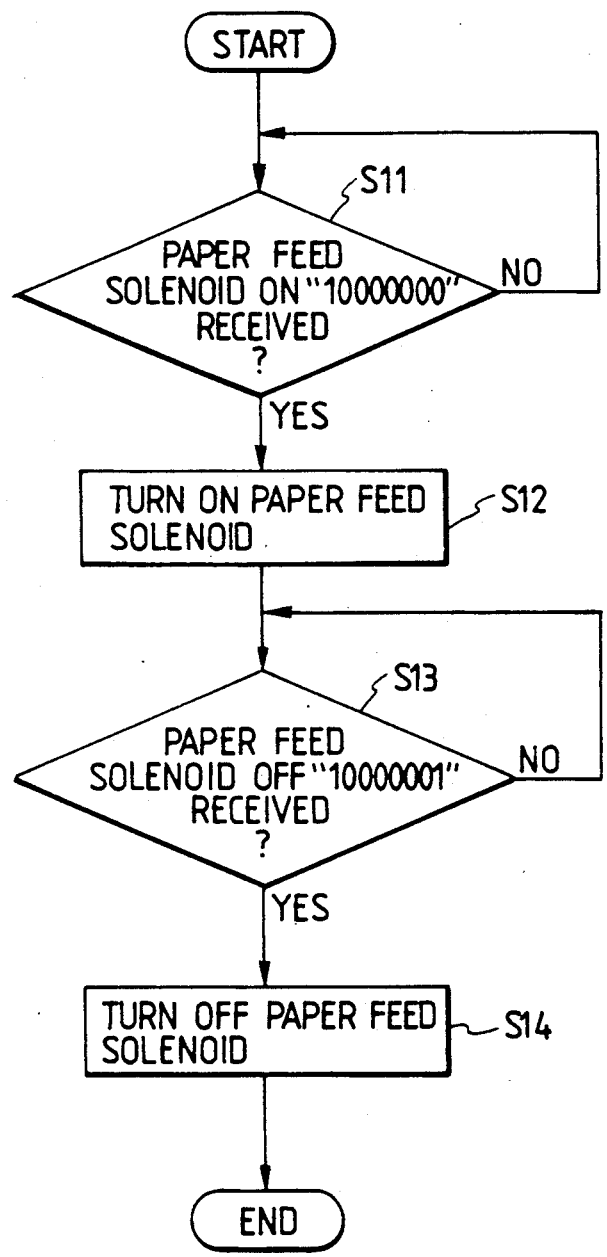
Figure 6:
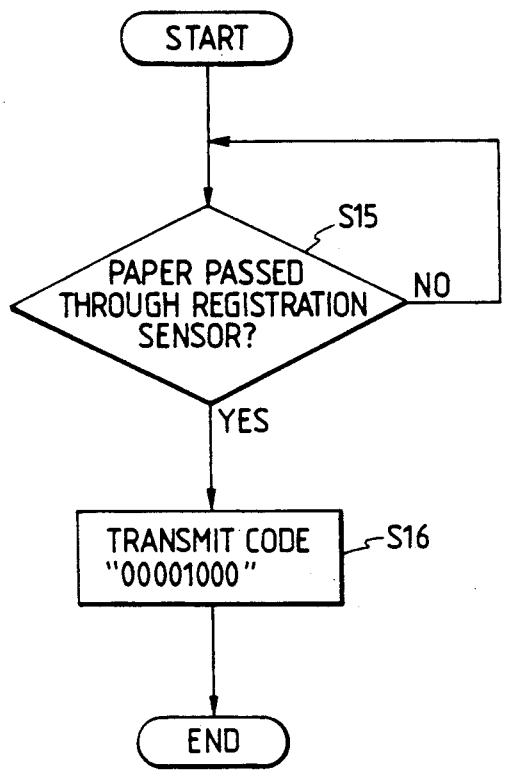
Figure 7:
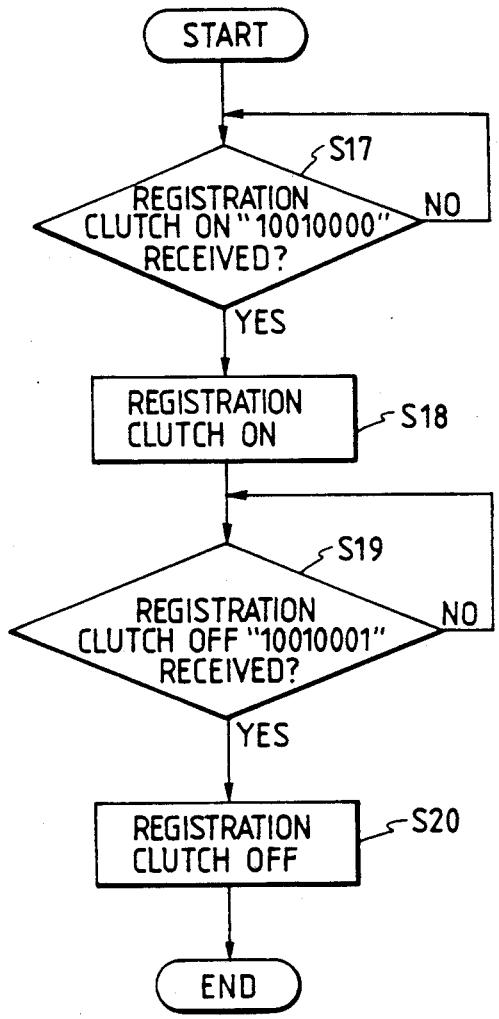

FIGS. 4 to 7 are flow charts of communication sequence between the optical communication unit 53, 54 controlled by the CPU 51 and other units 55, 56, 57. More specifically, FIG. 4 is a flow chart of the communication seen from the optical communication units 53, 54 controlled by the CPU 51, while FIG. 5 is a flow chart of the communication seen from the unit 55 for the sheet feeding solenoid, FIG. 6 is a flow chart seen from the unit 57 for the registration sensor, and FIG. 7 is a flow chart seen from the unit 56 for the registration clutch. FIG. 8 is a schematic view of the interior of the printer, for the purpose of understanding the flow charts shown in FIGS. 4 to 7.

In FIG. 8 there are shown a sheet feeding roller 20 for feeding the sheets contained in a sheet cassette, one by one, into the apparatus; registration rollers 202 for correcting skewed advancement of the sheet; a registration sensor 201 for discriminating the presence or absence of a sheet in front of the registration rollers 202; and a fixing heater 301 for fixing a toner image, formed on the sheet, to said sheet at a predetermined temperature.

Referring to FIG. 4, a step S1 awaits the entry of a print signal from the controller. In response to the print signal, a step S2 sends a code "10000000" for energizing the sheet feeding solenoid for rotating the sheet feeding roller 200, through the modulation circuit 71. The first bit "1" indicates an output information from the CPU 51 of the DC controller 52. Next four bits "0000" indicates a signal to the sheet feeding solenoid, and last three bits "000" indicates "on". After the sheet feeding solenoid is energized, the CPU 51 waits for a predetermined time in a step S3, and thereafter sends, in a step S4, a code "10000001" for turning off the sheet feeding solenoid. Then a step S5 awaits the reception of a code "00001000" from the optical communication unit 57, indicating the presence of a sheet at the registration sensor 70, and, upon receipt of said code, the CPU 51 sends, in a step S6, to the controller a VSREQ signal requesting the transmission of image signal. Then, in response to the reception of a sub scanning synchronization signal VSYNC from the controller in a step S7, the CPU 51 sends, in a step S8, a code "10010000" for turning on the registration clutch 69. Then the CPU waits for a predetermined time in a step S9, and sends, in a step S10, a code "10010001" for turning off the registration clutch 69, thereby terminating the sequence.

Now referring to FIG. 5, in response to the reception of the solenoid-off code in a step S11, the optical communication unit 55 energizes the sheet feeding solenoid 68 in a step S12, thus rotating the sheet feeding roller 200. Then, in response to the solenoid-off code received in a step S13, the unit 55 turns off the sheet feeding solenoid, thereby stopping the sheet feeding roller 200.

The flow chart shown in FIG. 6 shows a sheet detection sequence by the registration sensor 70. Upon detection of a sheet in a step S15 by the registration sensor 70, the optical communication unit 57 sends, in a step S16, a code "00001000" indicating a sheet present state.

The flow chart shown in FIG. 7 shows a control sequence of the optical communication unit 56. In response to the reception of the clutch-on code in a step S17 from the optical communication unit 53, the optical communication unit 56 turns on the registration clutch in a step S18, thereby rotating the registration rollers 202. Then in response to the clutch-off code received in a step S19, the unit turns off the registration clutch 69 in a step S20, thereby stopping the registration rollers 202.

The optical communication in the present embodiment is conducted with light-emitting diodes, but it can also be achieved with laser diodes. Also said optical communication may naturally be replaced by ultrasonic communication.

Also in the present embodiment there are not employed light guides such as optical fibers, but it is naturally possible to employ such light guides. It is furthermore possible to embed such light guides such as optical fibers or transparent plastic members into the casing.

2nd Embodiment

In the following explained is a 2nd embodiment of the present invention, with reference to the attached drawings.

In said 2nd embodiment, each optical communication unit is a modulation/demodulation unit capable of both modulation and demodulation, and a communication code of 2 bytes is employed for handling multi-level data, instead of the 1-byte code in the 1st embodiment.

Figure 9:
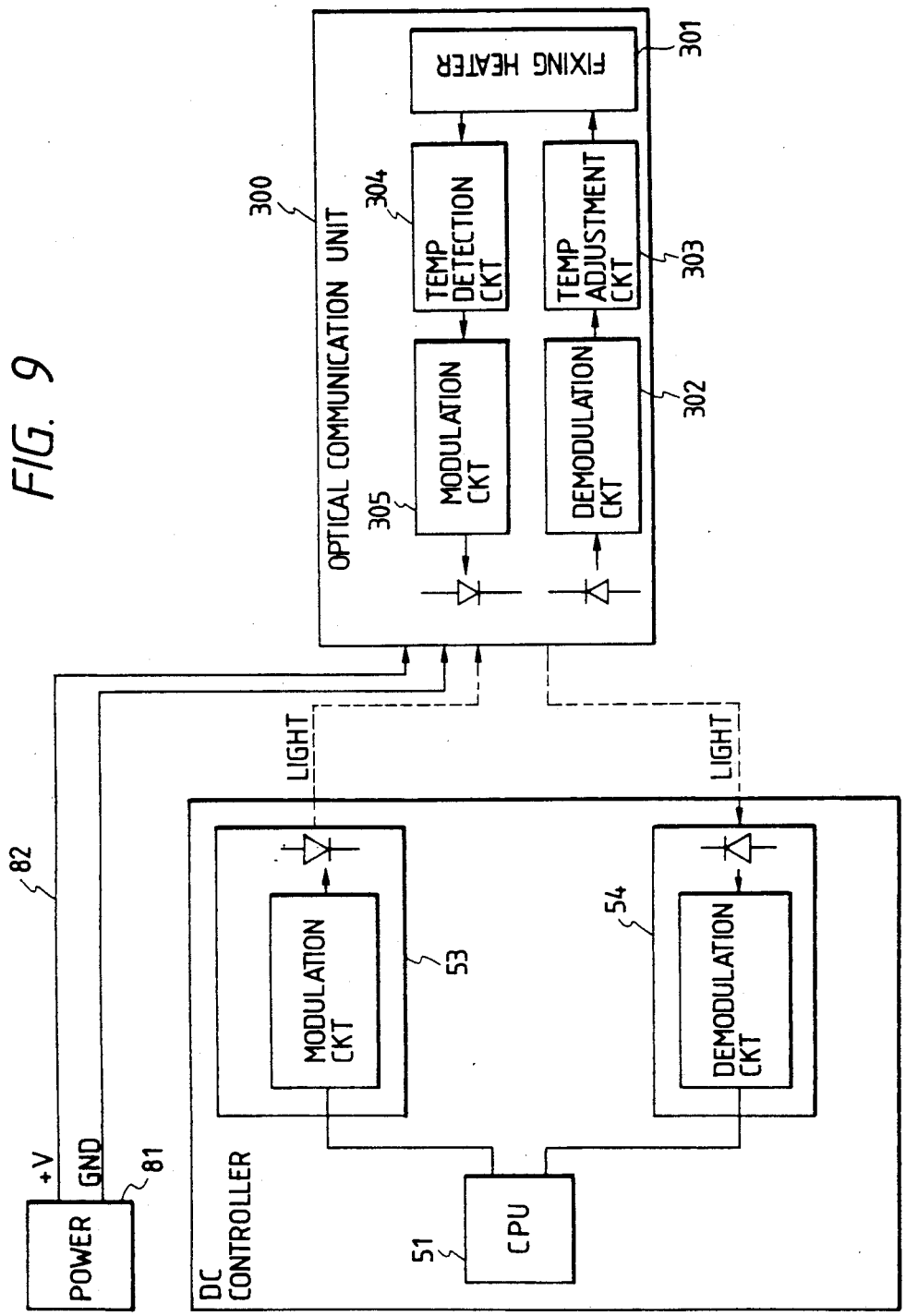
FIG. 9 is a block diagram of a second embodiment.

FIG. 9 is a block diagram showing the communication between the DC controllers and, as an example, an optical communication unit 300 for controlling a fixing heater 301 in the laser beam printer. When the light emitted from a modulation unit 53 of the DC controller 52 is received by a demodulation circuit 302 in an optical communication unit 300, a temperature adjustment circuit 303 elevates the temperature of a fixing heater 301. A temperature detection circuit 304 detects the temperature of said fixing heater 301, and sends the information to a modulation circuit 305, which effects optical communication to a demodulation circuit 54. The content of said communication, and the sequence thereof will be explained in the following with reference to FIGS. 10, 11 and 12.

Figure 10:
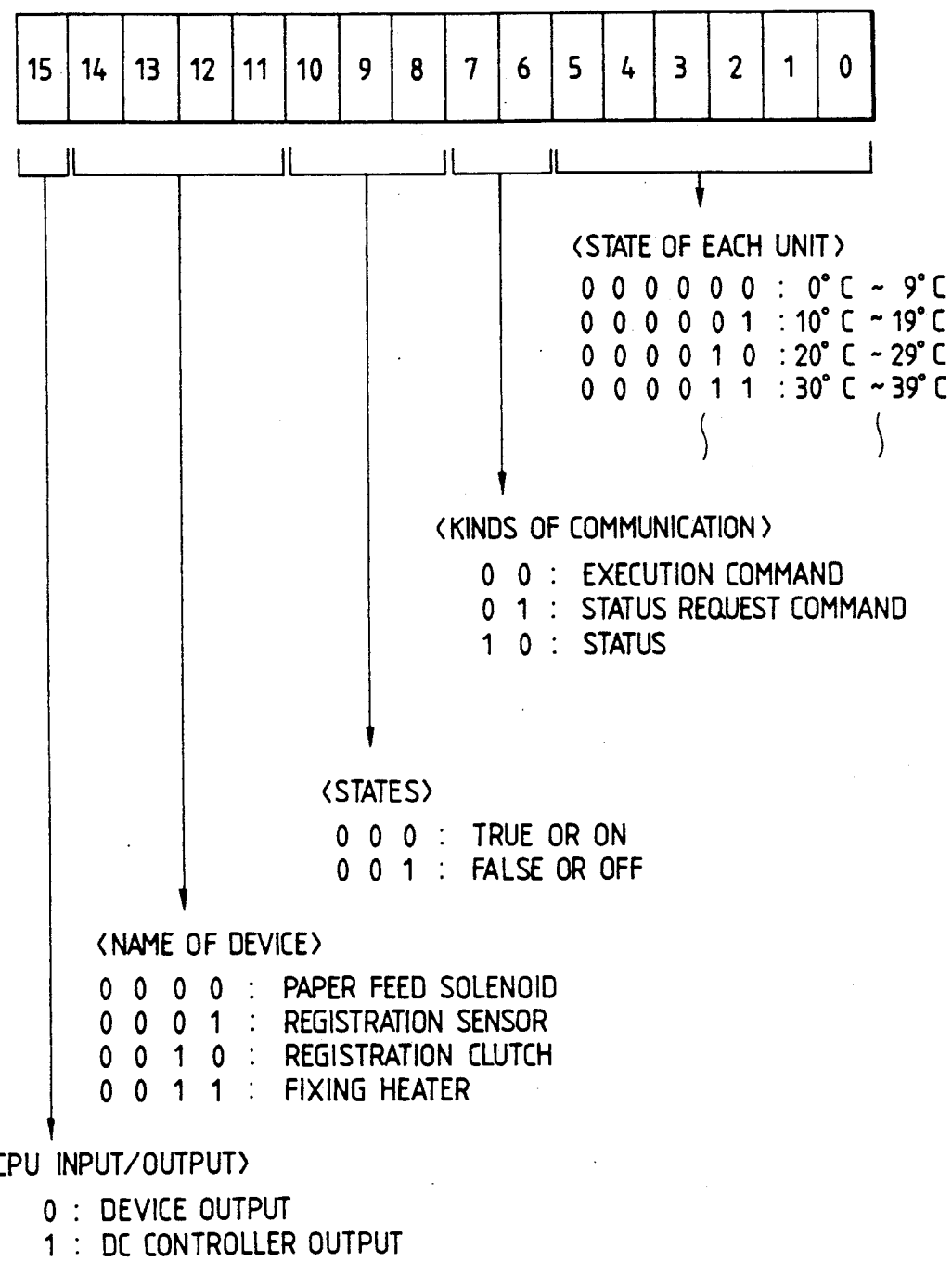
FIG. 10 is a chart showing the structure of communication data of said second embodiment.

FIG. 10 shows the structure of communication code used in the communication between the optical communication units. The communication between the unit 53 or 54 controlled by the CPU 51 and other optical communication units is conducted with a 16-bit code as shown in FIG. 10.

A bit 15 indicates the input information to or output information from the CPU 51, and is "1" in case the CPU 51 sends a code to the unit 55 or 56, or "0" in case the CPU 51 receives a code from the unit 57. Bits 14–11 are data for identifying devices corresponding to the modulation/demodulation unit. For example, "0000" indicates a unit 55 for driving the sheet feeding solenoid 68; "0001" indicates a unit 57 for transmitting the state of the registration sensor 70; "0010" indicates a unit 56 for driving the registration clutch 69; and "0011" indicates a unit 300 for controlling the fixing heater 301. Bits 10–8 indicate, for example, on- or off-state of temperature adjustment of the fixing heater; "000" for on-state of temperature adjustment, and "001" for off-state.

Bits 7 and 6 serve for identifying commands and status codes. The command codes, consisting of execution commands (instructing operations to the units) and status request commands (checking the state of the units), are sent from the DC controller to the various units. The status codes are sent to the DC controller for informing the state of the units. In the present embodiment, "00" stands for an execution command, "01" for a status request command, and "10" for a status code. Bits 5–0 are used for indicating the state of each unit, or the temperature of the fixing heater 301 in the present embodiment; "000000" for a temperature range of 0°–9° C., "000001" for 10°–19° C., "000010" for 20°–29° C., and "000011" for 30°–39° C.

FIGS. 11 and 12 are flow charts of optical communication between the unit controlled by the CPU 51 and another unit.

FIG. 11 is a flow chart of the communication sequence seen from the optical communication unit controlled by the CPU 51, while FIG. 12 is a flow chart seen from the fixing heater.

When the power supply for the laser beam printer is turned on in a step S21, a step S22 sends a heater temperature request code "9840H" (H standing for hexadecimal) or "10011XXX01XXXXXX"$_2$ for identifying the temperature of the fixing heater 301. The optical communication unit 300, upon reception of said request code in a step S27, causes the temperature detection circuit 304 to measure the temperature of the fixing heater 301 in a step S28. Then, in a step S29, a heater temperature code, for example "1882H" or "00011XXX10000010"$_2$ for 20° C. to the optical communication unit of the DC controller 52. Upon receiving said heater temperature code in a step S23, the CPU 51 discriminates, in a step S24, whether said temperature has reached a predetermined nominal temperature. If not, the CPU 51 sends, in a step S25, a heater temperature adjustment start code "9800H" or "10011XXX00XXXXXX"$_2$. The optical communication unit 300, upon receiving said start code in a step S30 from the unit 53 of the DC controller 52, causes the temperature adjustment circuit 303 to start temperature adjustment of the fixing heater 301 in a step S31. After the lapse of a predetermined time from the start of temperature adjustment, the sequence returns to the step S22. Also in case the nominal temperature is reached in the discrimination of the step S24, the sequence returns to the step S22 after the lapse of a predetermined time.

As explained in the foregoing, the absence of wirings in the apparatus enables compactization of the apparatus.

3rd Embodiment

In the present embodiment, plural output and input signals distributed among the apparatus are physically and functionally unified into plural units. Each unit is provided with a control unit for input/output control for said unit, and an optical communication unit containing a light-emitter and a light-receiver for information exchange with a main control unit for controlling said plural units. On the other hand, the main control unit is provided with an optical communication unit having a light-emitter and a light-receiver for transmission to and reception from said plural units, and effects optical communication with selected one of said plural units. In this manner the input/output control of various electrical components is made possible without the wire connections.

Also the main control unit identifies, through the optical communication unit thereof, that the information exchange with a certain unit is not possible, and withholds the control information in order to interrupt the ordinary function. It is therefore rendered possible to detect the opening of a door or the malfunction of a unit.

FIG. 13 is an overall block diagram of a printer constituting the third embodiment. The printer requires various input/output (I/O) controls for printing operation and transportation of the recording medium. In said printer, since the sheet feeding is possible from two (upper and lower) cassettes, the I/O controls for the sheet feeding unit are doubled in comparison with a printer with a single cassette.

A main control unit 101 is provided with two optical communication control units 102, 103, each composed of a light-emitting device and a light-receiving device. In the present embodiment two optical communication units are employed because of the presence of an obstacle in the light path due to the structural limitation. On the other hand, the optical communication with the upper/lower sheet feeding units 131/132 and with an operation panel unit 133 can be made through a same light path, through the use of reflective members.

A high-voltage unit 126 supplies a high voltage for charging a photosensitive drum.

Each unit is defined as a group of components that can be physically and functionally grouped. Thus the input/output elements connected to each unit, such as sensors, switches, solenoids, fans etc. are controlled by serial data obtained by optical communication. Also the operation panel unit 133 provides displays based on the serial data obtained by optical communication from the main control unit 101.

Figure 14B:
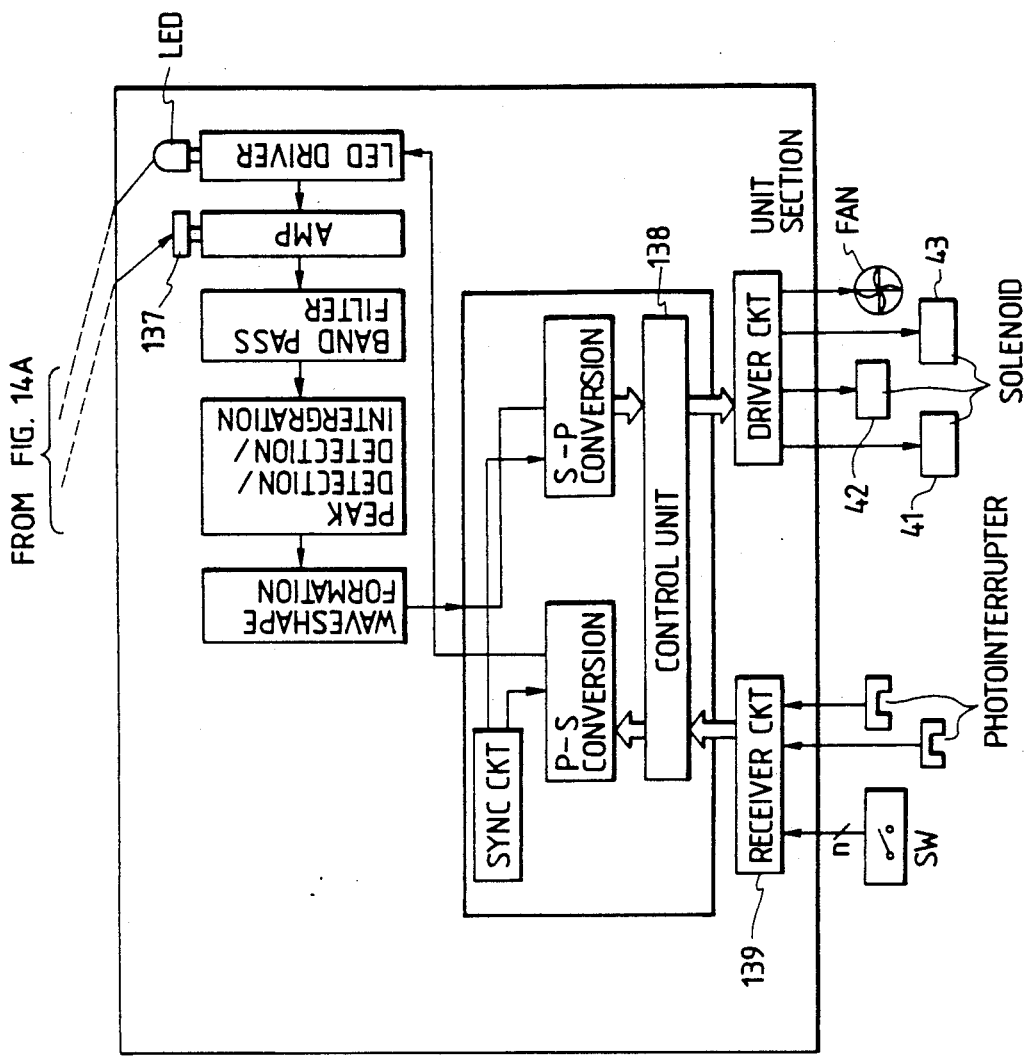

FIG. 14 is a block diagram of the main control unit 101 and units 121, 131, 132, 133 of the present embodiment. In the following explained is the photoelectric conversion from the light-emitting device (for example a light-emitting diode) to the light-receiving device (for example phototransistor), with reference to FIG. 14.

A microprocessor 106 of the main control unit 101 releases, from an output port thereof, a lighting signal for lighting the light-emitting device 107. Said signal is composed of pulses of several tens to several hundreds KHz, in order to increase the light intensity from said device 107 since it is distanced from the light-receiving device. An LED driver provides a lighting current of about 100–500 mA whereby the light-emitting device emits desired light.

Figure 15:
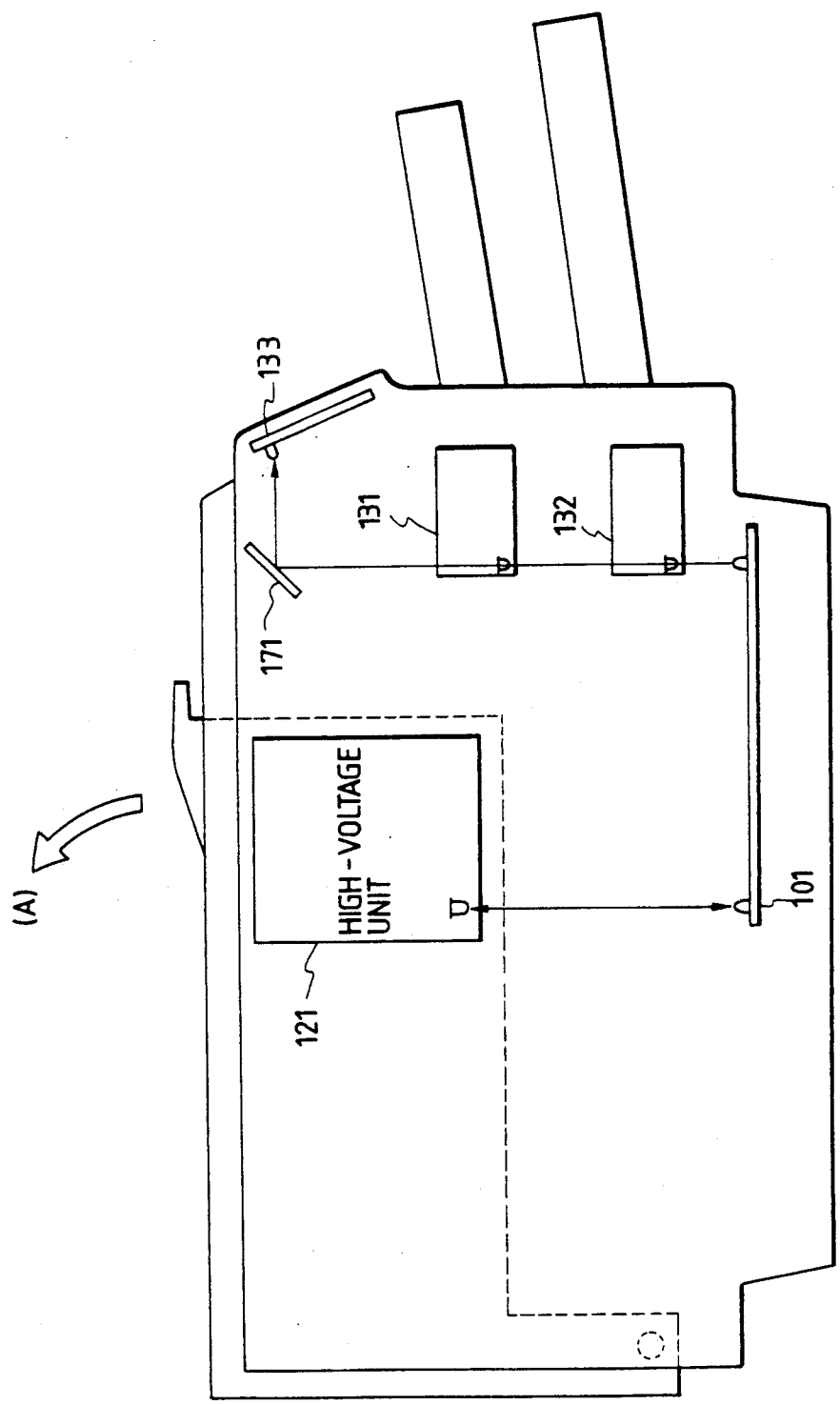
FIG. 15 is a schematic view showing the arrangement of various units in the apparatus.

The light thus emitted proceeds according to the directivity of the light-emitting device, and reaches the light-receiving device 137 of the unit, eventually by way of the reflective member 171 shown in FIG. 15. The light signal generated from the light-receiving device (photodiode) 137 is of the order of several tens of microvolts (peak to peak), and is amplified by 70–80 dB by an amplifier circuit. The gain of said circuit is determined by the ambient illumination and the intensity of input signal. The signal is then guide through a band-pass filter for eliminating the noise components, and the signal component alone is extracted by peak detection, rectification and integration. Finally wave forming is conducted for example with a Schmidt circuit to obtain a digital signal.

Serial signal is subjected to serial-parallel conversion by a shift register and released in synchronized manner by a synchronization circuit. Also the control unit 138 compares the identification code of the received signal with that of the unit, and the digitizing in the unit is conducted when said identification numbers mutually coincide.

In the following there will be explained the sending of the input signal for example from a photointerruptor from the unit to the main control unit 101. The input state in each unit is constantly stored by a receiver circuit 139. When the identification code of the signal from the main control unit 101 coincides with that of the unit, and the signal succeeding to said identification code is identified as a status request command, the control unit 138 of the unit reads the input state information from said receiver circuit 139, then effects parallel-serial conversion, and sends said information together with the identification code of said unit to the main control unit 101.

The main control unit 101 identifies said signal through the aforementioned analog-digital conversion circuit.

Figure 16:
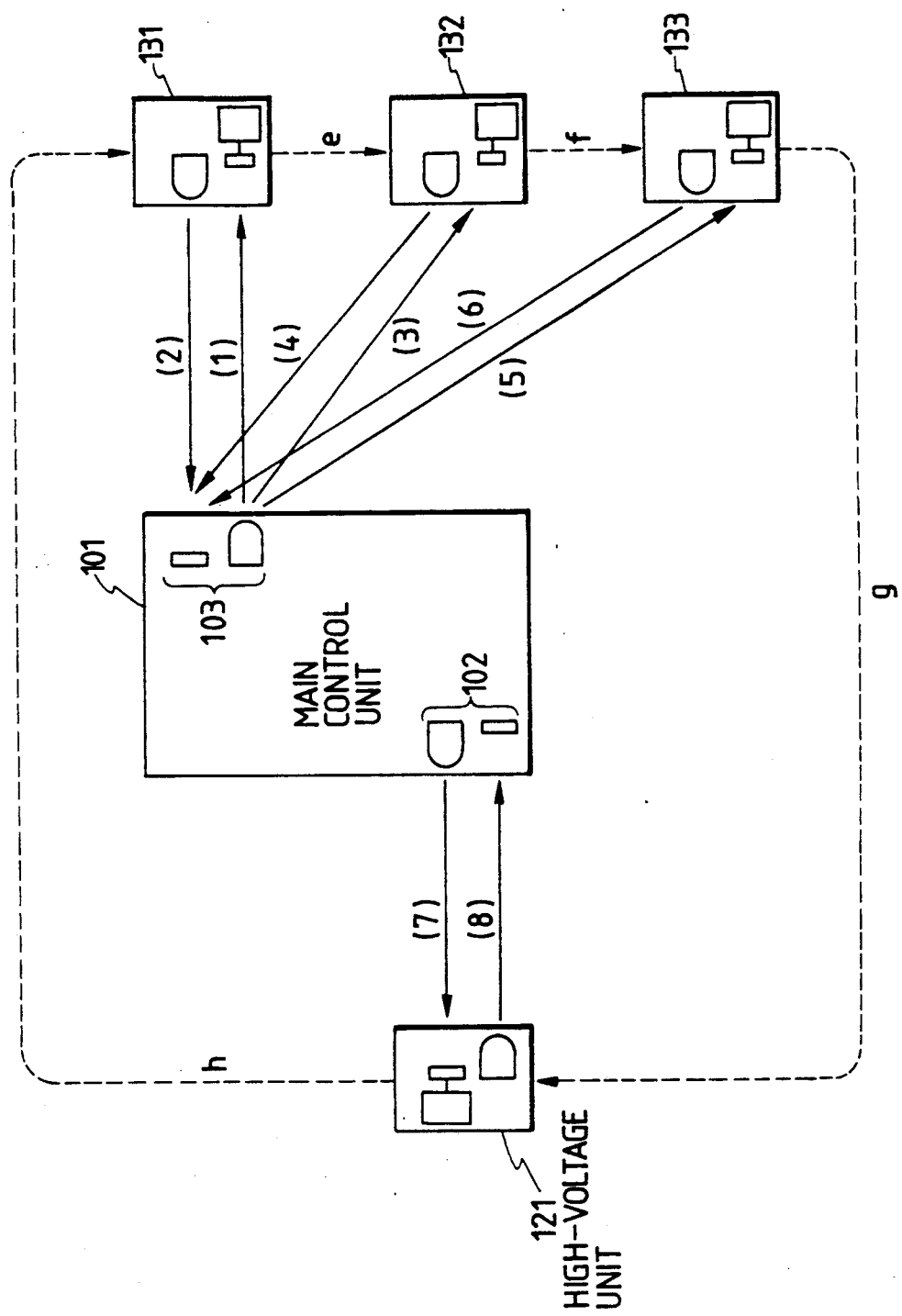
FIG. 16 is a block diagram showing the state of communication.
Figure 17:
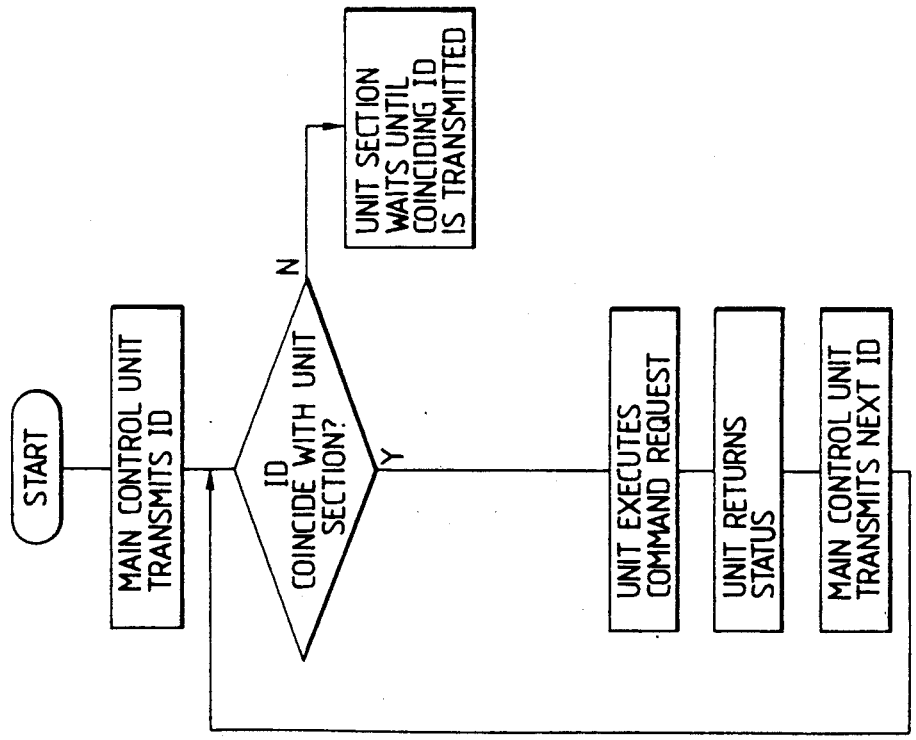
FIGS. 17 and 18 are flow charts showing the control sequence of communication.

FIG. 16 is a block diagram showing the mode of communication in the present embodiment, and the control sequence is shown in a flow chart in FIG. 17. FIG. 16 schematically shows the communication procedure between two optical communication units 102, 103, each having the light-emitting device and the light-receiving device, of the main control unit 101, and four units 121, 131, 132 and 133. The main control unit 101 executes communication with said units in plural control routines, without priority in the units 121, 131, 132, 133. Numbers (1) to (7) indicate the sequential order of communications, so that the communications with the various units are controlled in the order of e → f → g → h → e . . .

The actual control sequence is more complicated because the main control unit naturally executes other processes such as video interfacing with an unrepresented controller or automatic control of laser power in parallel manner. However, disregarding such other processes, the units are controlled in the above-mentioned sequential order.

Figure 18:
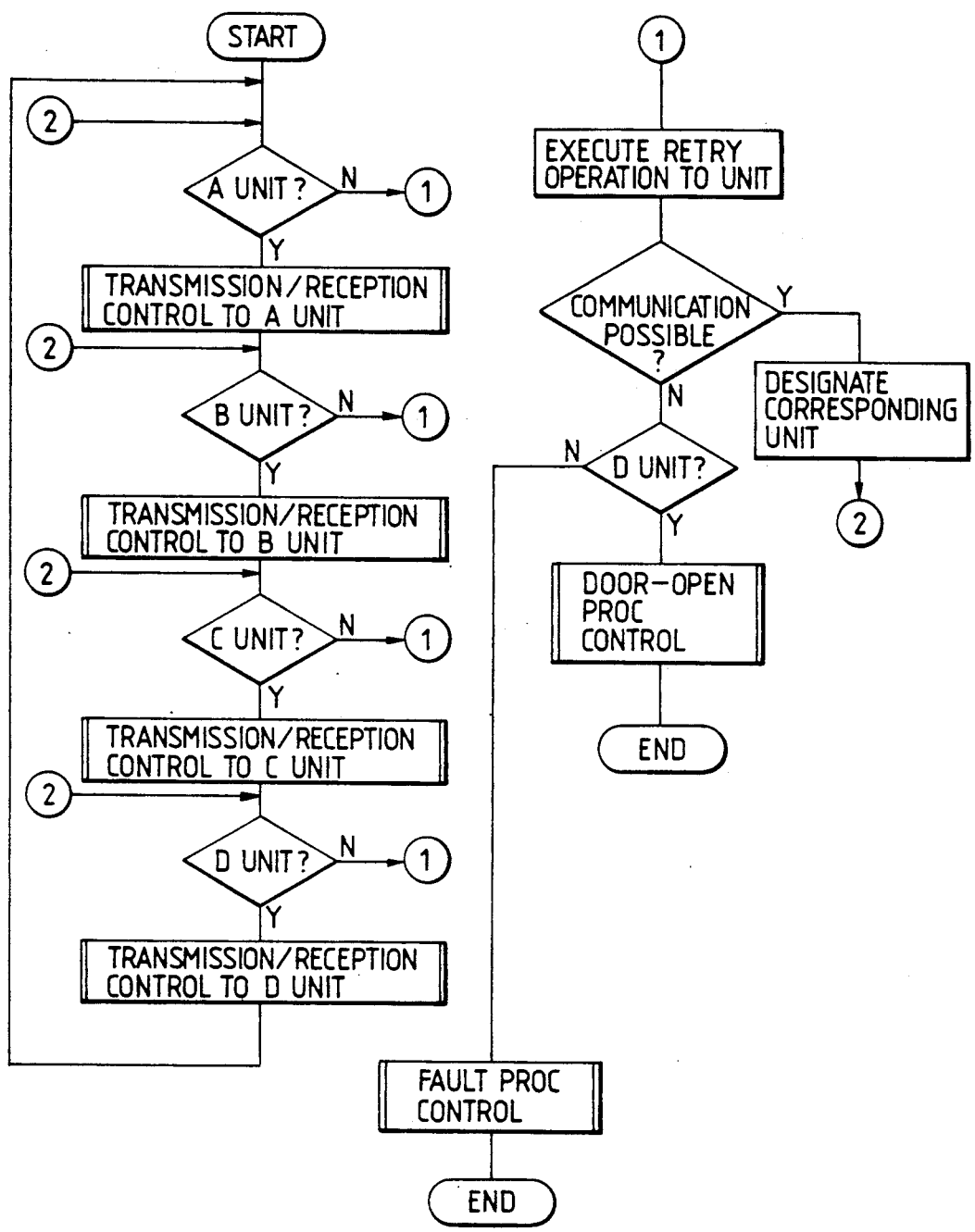

FIG. 15 is a schematic view showing the arrangement of various units in the apparatus of the present embodiment, wherein a door can be opened in a direction (A) for loading of a consumable component (toner cartridge) or removal of jammed sheet. The high-voltage unit is mounted on the movable part of the door, so that the communication is not possible by the ambient light when the door is opened. The main control unit 101 confirms the presence of all the units 121, 131, 132, 133 in advance by communication with said units. Thus the open state of the door can be identified if the communication with the high-voltage unit 121 is interrupted in a flow chart shown in FIG. 18. Also the malfunction of another unit can be identified if the communication with said unit is interrupted.

When the door is open, the status of each unit, for example the selection of upper or lower sheet feeding slot, number of copies, whether the printing operation is in progress etc. is diverted in the RAM. Also when the door is opened, a connector for supplying the high-voltage unit 12 with electric power is disconnected. Consequently the high-voltage unit 121 is turned off, and other actuators such as motors and solenoids are also turned off.

When the door is closed again, the communication with the high-voltage unit 121 is restored, so that the main control unit 101 re-opens the process interrupted by the opening of the door.

As will be understood from the foregoing, the opening of the door can be detected by the communication means for unit control.

4th Embodiment

Figure 19:
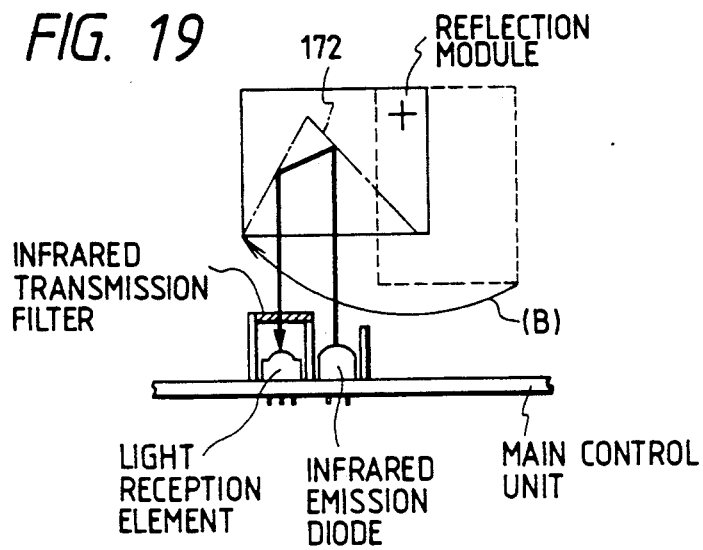
FIG. 19 is a schematic view of a fourth embodiment.

FIG. 19 shows the structure of a fourth embodiment. A reflection module, equipped with a reflection member 172 capable of reflecting the infrared light, moves as indicated by an arrow (B) in relation to the opening of the door, and assumes the solid-lined position when the door is open.

In this state, the normal communication signal cannot be transmitted, thus causing a communication error. Thus, in order to identify whether this is a true communication error or is caused by the opening of the door, the main control unit 101 executes following step.

The infrared-emitting diode is activated with a particular pulse signal for detecting the door open state, different from the normal communication data. Said particular signal has to be distinguishable from external light, for example the light of fluorescent lamps or other infrared light. Said infrared light is received by the light-receiving device through the reflection member and is compared with said particular pulse signal, whereby the door open state or the malfunction can be discriminated.

The process after said comparison is similar to that already explained and will not, therefore, be explained.

5th Embodiment

Figure 21:
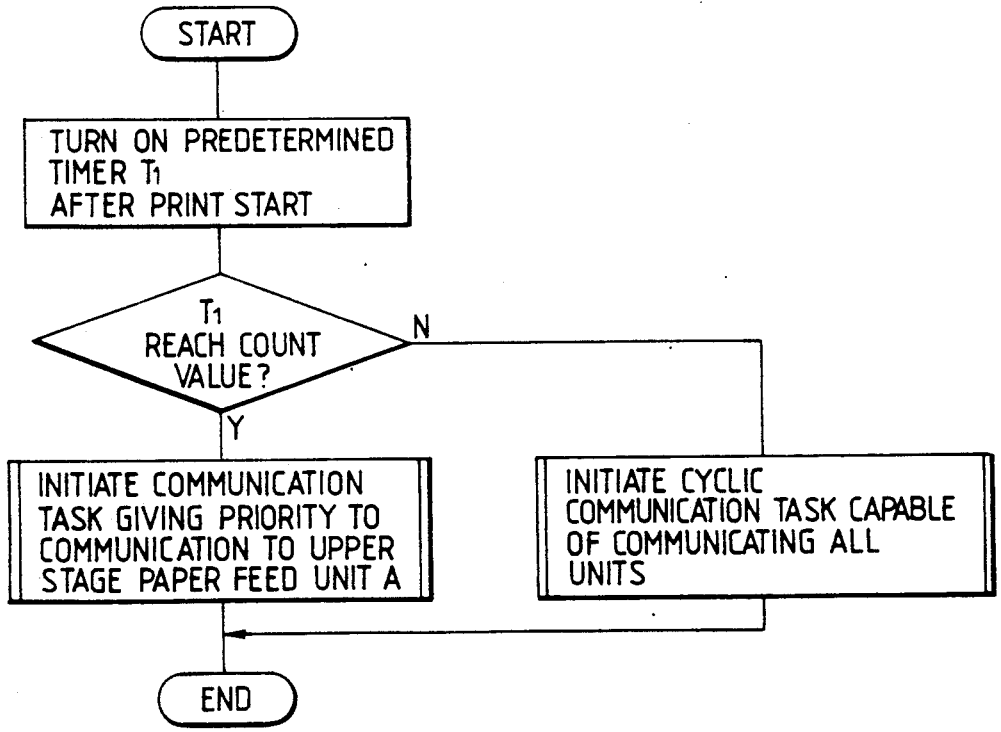
FIG. 21 is a flow chart of the control sequence of communication in said fifth embodiment.
Figure 20:
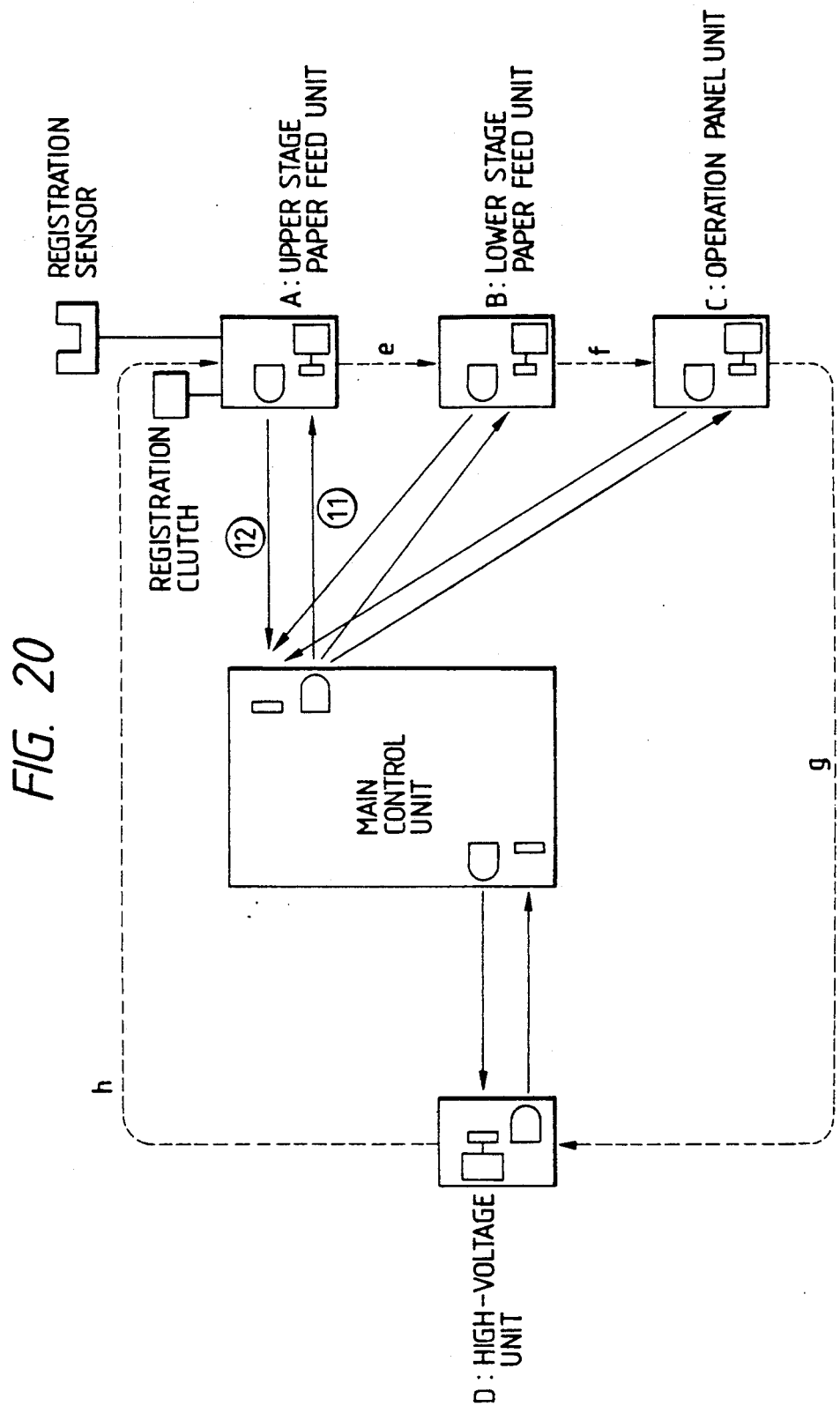
FIG. 20 is a block diagram showing the mode of communication in a fifth embodiment.

FIG. 20 is a block diagram showing the mode of communication in a fifth embodiment, and FIG. 21 is a flow chart showing the control sequence thereof.

Figure 24:
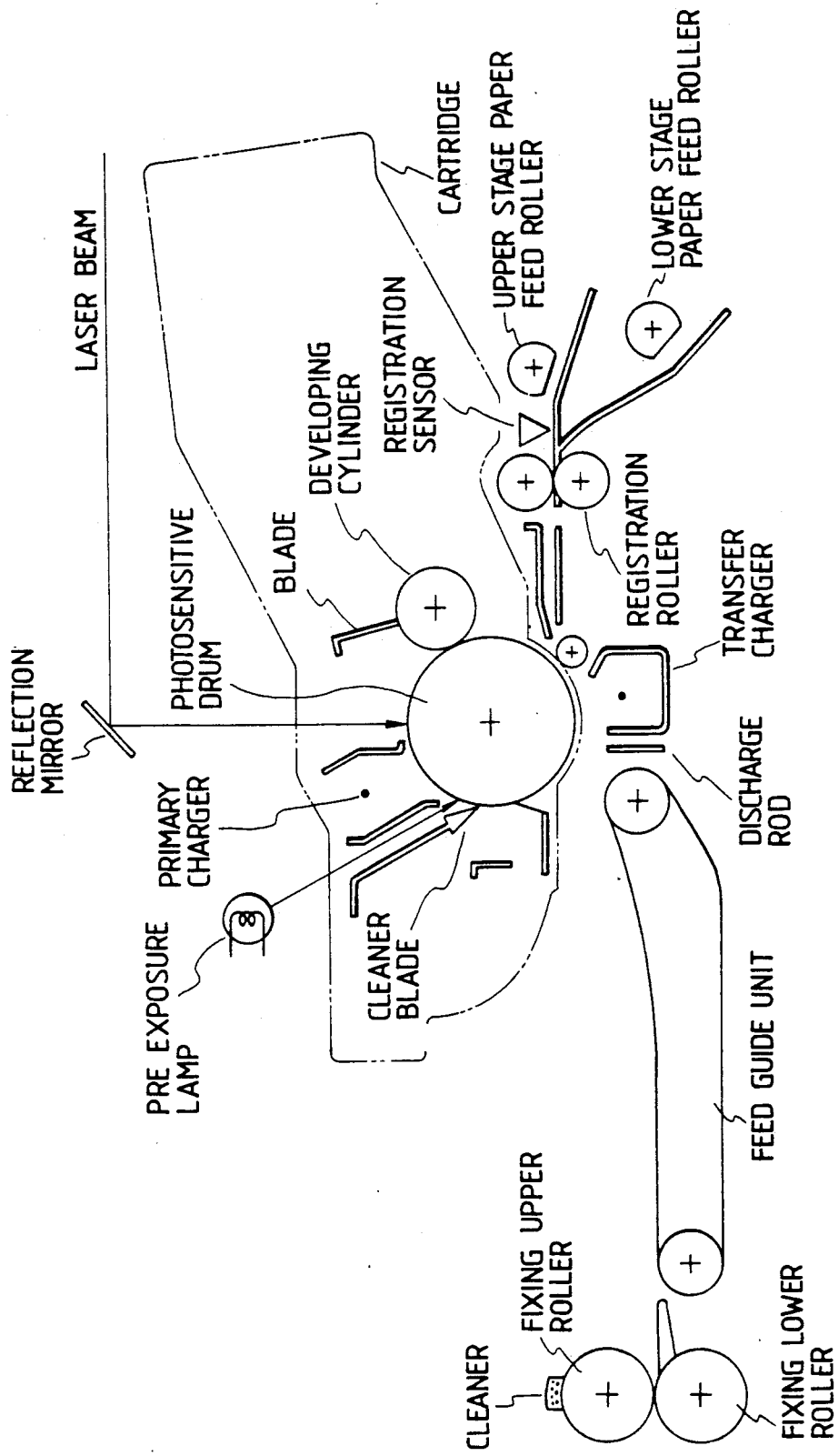
FIG. 24 is a view showing the structure around a photosensitive drum in an electrophotographic recording apparatus.

In the present embodiment, the units are given priorities, according to which the optical communications are conducted. Said priorities are determined by required functions, performances and characteristics of the apparatus. In the following there will be explained, as an example, the position detection at the registration rollers of a printer, with reference to FIG. 24 showing the structure around a photosensitive drum of an electrophotographic recording apparatus.

A recording sheet transported by the sheet feeding roller form a loop of predetermined amount (about 6-10 mm) upon arriving at the registration rollers. Said registration rollers start rotation by a video synchronization signal supplied from the controller. The above-explained procedure is adopted in order to correct defective transportation, particularly skewed transportation, of the recording sheet. On the other hand, the amount of said loop is influenced by the precision of sheet transportation after the start of sheet feeding, and fluctuates significantly if the transportation is not precise enough. If a space for accommodating such loop is not available in front of the registration rollers, the above-mentioned objective of correcting the skewed advancement cannot be achieved, and there may eventually result troubles such as sheet jamming. Consequently precise detection of the recording sheet by the registration sensor is required. Thus a high priority is required in the control of the main control unit. Thus, as shown in the flow chart, the optical communication controls (11) and (12) are preferentially executed for the detection with the registration sensor belonging to the upper sheet feeding unit.

On the other hand, the communication with the lower sheet feeding unit is given a lowest priority. This is because, when the lower sheet feeding slot is selected and the printing operation is started by a print signal, requirements can be satisfied by returning the status, such as the presence or absence of sheet, when the lower sheet feeding slot is selected next time.

6th Embodiment

Figure 23:
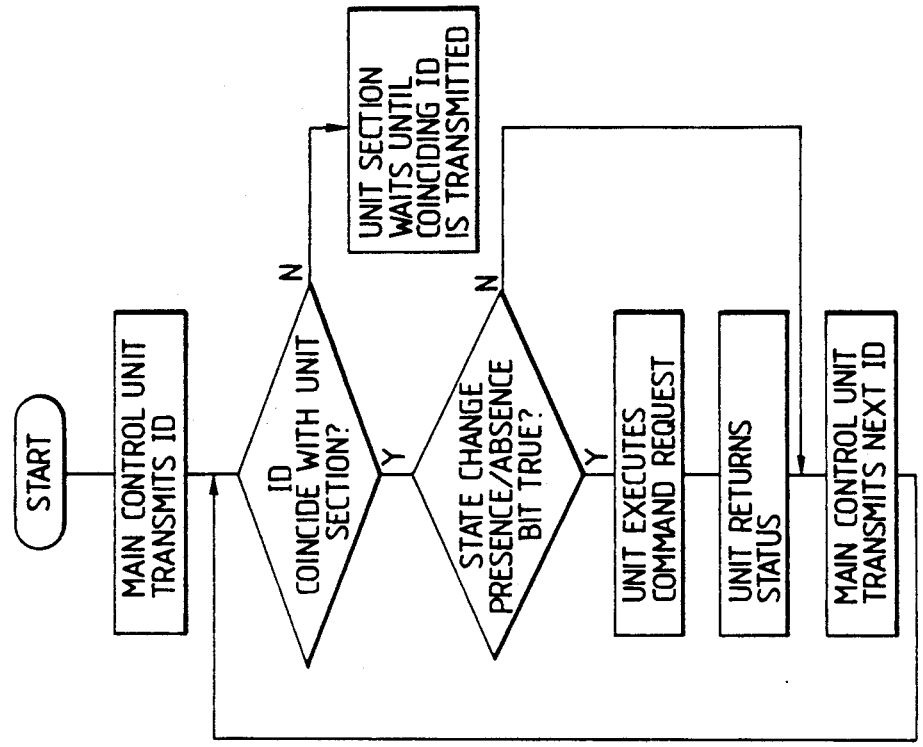
FIG. 23 is a flow chart of the control sequence of communication in said sixth embodiment.
Figure 22:
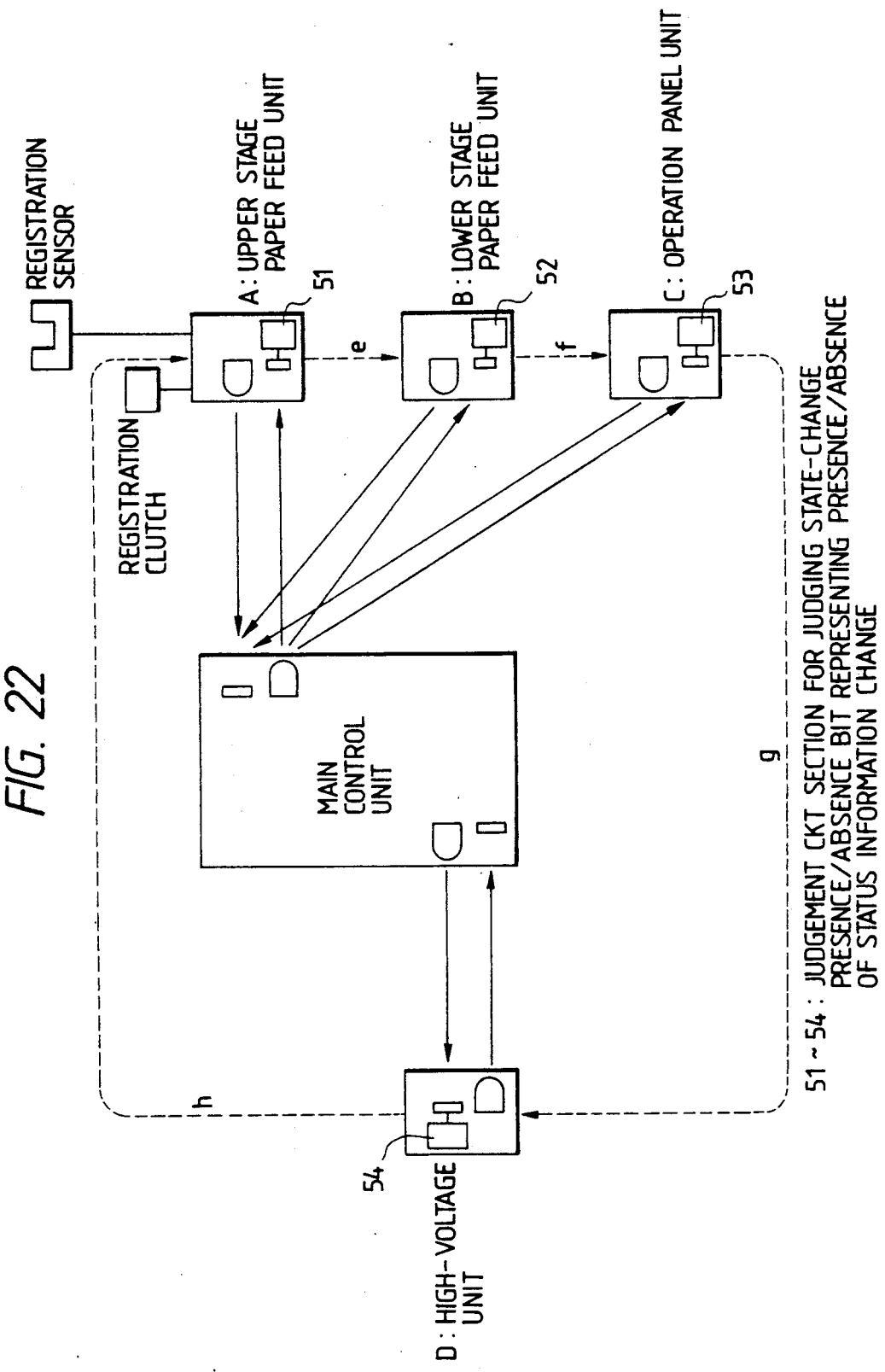
FIG. 22 is a block diagram showing the mode of communication in a sixth embodiment.

FIG. 22 is a block diagram showing the mode of communication of a sixth embodiment, and FIG. 23 is a flow chart showing the control sequence thereof.

In the present embodiment, each unit forms a stage-change presence/absence bit indicating a change in the status information of said unit, and, in the communication of said unit with the main control unit 101, transfers the status information only when said state-change presence/absence bit is effective, namely when a change occurs in the status. Consequently the throughput in the communication between the main control unit and other units is improved, so that the main control unit can be used for a larger number of other jobs.

The parallel output stage of each unit has a latch function, so that the information once set is retained.

In the communication sequence of the foregoing embodiments, the access is always made by the main control unit, but interruptions may be made, when necessary, from the units to the main control unit.

The foregoing embodiments have been explained by an example of printer, but they are applicable to local communication control in any apparatus and preferably applied to an apparatus requiring many input/output data, such as a facsimile machine or a copying machine.

The above-explained embodiments provide following advantages:

1) Wire harness connection with the main control unit can be dispensed with, so that there can be achieved compactization and cost reduction of the printed circuit board of the main control unit, and compactization of the apparatus itself;

2) Since the assembly and wiring are required only in respective units, the mounting of the main control unit and other units in the apparatus does not require wiring operations, so that the assembling efficiency and the reliability can be improved;

3) Since the main control unit is isolated by light from other units, there is obtained an increased margin for electrostatic noise, AC line noise and radiation noises;

4) Opening of the door of the apparatus can be detected without an exclusive sensor, so that there can be achieved cost reduction and improved space factor.

Though the present invention has been explained by the preferred embodiments thereof, it is subject to various modifications and applications within the scope and spirit of the appended claims.

We claim:

1. An electronic apparatus comprising:
   control means;
   first light-emitting means for emitting a light in response to a control signal generated by said control means; and
   plural operation means each of which comprises reception means for receiving the light emitted by said light-emitting means and second light emitting means for emitting a light in accordance with a state of said operation means,
   wherein said operation means functions according to the result of the reception by said reception means;

said control means generates the control signal such that the lights to said respective operation means are sequentially emitted by said first light-emitting means, and said control means controls said plural operation means on the basis of light emission of said second light-emitting means.

2. An apparatus according to claim 1, wherein said operation means is adapted to provide displays according to the result of reception by said reception means.

3. An apparatus according to claim 1, wherein said light-emitting means comprises a light-emitting diode.

4. An apparatus according to claim 1, adapted for effecting image formation.

5. An electronic apparatus comprising:
plural operation means;
light-emitting means for sequentially emitting lights corresponding to states of said plural operation means;
reception means for receiving the light emitted by said light-emitting means; and
control means for controlling said plural operation means in accordance with results of the reception by said reception means,
wherein said light-emitting means emits the lights at frequencies according to importance in said plural operation means.

6. An apparatus according to claim 5, wherein said control means further comprises detection means adapted to detect the position of said operation means.

7. An apparatus according to claim 5, wherein said light-emitting means comprises a light-emitting diode.

8. An apparatus according to claim 5, adapted for effecting image formation.

9. An electronic apparatus comprising:
a casing;
an openable part provided in said casing;
operation means provided on said openable part, said operation means further comprising light-emitting means for emitting a light in accordance with a code representing a state of said operation means;
reception means for receiving the light emitted by said light-emitting means; and
recognition means for recognizing the state of said operation means, on the basis of the light received by said reception means,
wherein said recognition means recognizes, when abnormality occurs in the reception of said reception means, that said openable part is opened.

10. An apparatus according to claim 9, wherein said light-emitting means comprises a sensor and is adapted to emit light according to the result of detection by said sensor.

11. An apparatus according to claim 9, adapted to effect image formation and to interrupt said image formation when a part of said casing is in an open state.

12. An electronic apparatus comprising:
a casing;
an openable part provided in said casing;
operation means provided on said openable part, said operation means further comprising transmission means for transmitting a code which represents a state of said operation means; and
reception means for receiving the code transmitted by said transmission means; and
recognition means for recognizing the state of the operation means, on the basis of a reception result of said reception means,
wherein said recognition means recognizes that said openable part is opened, on the basis of reception of an abnormality of said reception means.

13. An apparatus according to claim 12, wherein said discrimination means is adapted to retain said electronic apparatus in a standby state, upon discrimination that said openable part is opened.

14. An apparatus according to claim 12 wherein said transmission means further comprises light-emitting means and said reception means further comprises light-receiving means.

15. An apparatus according to claim 12, wherein said recognition means further comprises second transmission means to transmit a control signal to said operation means.

16. An apparatus according to claim 12, adapted for effecting image formation.

17. An apparatus according to claim 15, wherein said second transmission means further comprises light-receiving means.

18. An apparatus according to claim 16, further comprising:
a photosensitive member;
charge means for charging said photosensitive member;
latent image formation means for forming a latent image on said charged photosensitive member; and
development means for developing said latent image.

19. An apparatus according to claim 18, wherein said operation means controls said charge means.

20. An apparatus according to claim 12, wherein said light-emitting means further comprises a light-emitting diode.

21. An apparatus according to claim 12, wherein said recognition means controls second operation means in accordance with the state of said operation means.

22. An apparatus according to claim 21, wherein said recognition means further comprises a memory for holding a state of said second operation means which state is obtained at a time when it is recognized that said openable part is opened.

23. An apparatus according to claim 22, wherein said second operation means stops its operation when said openable part is opened, and
said recognition means restarts the stopped operation of said second operation means, on the basis of the state of said second operation means held in said memory.

24. An apparatus according to claim 9, wherein said recognition means further comprises transmission means for transmitting a control signal to said operation means, and
said operation means further comprises second reception means for receiving the control signal.

25. An apparatus according to claim 24, wherein said transmission means further comprises second light-emitting means.

26. An apparatus according to claim 9, further comprising:
a photosensitive member;
charge means for charging said photosensitive member;
latent image formation means for forming a latent image on said charged photosensitive member; and
development means for developing said latent image.

27. An apparatus according to claim 26, wherein said operation means controls said charge means.

28. An apparatus according to claim 9, wherein said recognition means controls second operation means in accordance with the state of said operation means.

29. An apparatus according to claim 28, wherein said recognition means further comprises a memory for holding a state of said second operation means which state is obtained at a time when it is recognized that said openable part is opened.

30. An apparatus according to claim 29, wherein said second operation means stops it operation when said openable part is opened, and
said recognition means restarts the stopped operation of said second operation means, on the basis of the state of said second operation means held in said memory.

31. An apparatus according to claim 28, wherein said second operation means further comprises paper feed means.

32. An apparatus according to claim 21, wherein said second operation means further comprises paper feed means.

33. An apparatus according to claim 1, wherein said operation means makes said second light-emitting means emit the light on the basis of light reception of said reception means.

34. An apparatus according to claim 4, wherein said operation means performs charging control of a photosensitive member or feeding control of a recording paper.

35. An apparatus according to claim 5, wherein said control means further comprises request means for requesting that said plural operation means sequentially make said light-emitting means emit the lights.

36. An apparatus according to claim 35, wherein said request means further comprises second light-emitting means.

37. An apparatus according to claim 5, wherein, when the state of said operation means changes, said control means detects the state of said operation means.

38. An apparatus according to claim 5, wherein said operation means further comprises a keyboard.

39. An electronic apparatus adapted for effecting image formation comprising:
plural operation means;
light-emitting means for sequentially emitting lights corresponding to states of said plural operation means;
reception means for receiving the light emitted by said light-emitting means; and
control means for controlling said plural operation means in accordance with results of the reception by said reception means,
wherein said operation means controls feeding of a recording paper, and makes said light-emitting means emit the light in accordance with a position of the recording paper.

40. An electronic apparatus adapted for effecting image formation comprising:
plural operation means;
light-emitting means for sequentially emitting lights corresponding to states of said plural operation means;
reception means for receiving the light emitted by said light-emitting means; and
control means for controlling said plural operation means in accordance with results of the reception by said reception means,
wherein said operation means further comprises first feed means for feeding a recording paper from a mounted position to an intermediate position and second feed means for feeding the recording paper from the intermediate position to a record start position,
said light-emitting means emits the light in accordance with presence of the recording paper at the mounted position and presence of the recording paper at the intermediate position, and
priority of the light emission according to the presence of the recording paper at the intermediate position is higher than that of the light emission according to the presence of the recording paper at the mounted position.

41. An apparatus according to claim 5, wherein said light-emitting means further comprises plural light-emitting diodes.

42. An apparatus according to claim 9, wherein said recognition means recognizes, when said reception means does not receive the light from said light-emitting means, that said openable part is opened.

43. An apparatus according to claim 12, wherein said recognition means recognizes, when said reception means does not receive the code from said transmission means, that said openable part is opened.

44. An electronic apparatus comprising:
first operation means which comprises first light reception means and operates on the basis of said first light reception means;
second operation means which comprises second light reception means and operates on the basis of said second light reception means; and
control means for controlling said first and second operation means, said control means further comprising first light-emitting means and second light-emitting means,
wherein said first light-emitting means sends a first control signal to said first light reception means,
said second light-emitting means sends a second control signal to said second light reception means,
said first operation means further comprises third light-emitting means and makes said third light-emitting means emit a light in accordance with a state,
said second operation means further comprises fourth light-emitting means and makes said fourth light-emitting means emit a light in accordance with a state, and
said control means further comprises third light reception means for receiving light from said third light emitting means and fourth light reception means for receiving the light from said fourth light-emitting means, and controls said first and second operation means on the basis of said third and fourth light reception means.

45. An apparatus according to claim 44, wherein said control means further comprises detection means for detecting the states of said first and second operation means.

46. An electronic apparatus comprising:
first operation means which comprises first light reception means and operates on the basis of said first light reception means;
second operation means which comprises second light reception means and operates on the basis of said second light reception means; and control means for controlling said first and second operation means, said control means further comprising first light-emitting means and second light-emitting means, wherein said first light-emitting means sends a first control signal to said first light reception means, said second light-emitting means sends a second control signal to said second light reception means, said first operation means further comprises charge means for charging a photosensitive member, said second operation means further comprises feed means for feeding a recording paper to said photosensitive member, and said control means controls forming of a latent image on said photosensitive member.

47. An apparatus according to claim 44, wherein each of said first and second light-emitting means further comprises a light-emitting diode.

48. An apparatus according to claim 9, wherein said recognition means controls said operation means.

49. An apparatus according to claim 12, wherein said recognition means controls said operation means.

* * * * *

UNITED STATES PATENT AND TRADEMARK OFFICE
CERTIFICATE OF CORRECTION

PATENT NO. : 5,051,601
DATED : September 24, 1991
INVENTOR(S) : HIROSHI ATOBE ET AL.

It is certified that error appears in the above-identified patent and that said Letters Patent is hereby corrected as shown below:

COLUMN 1

Line 38, "noises," should read --noise,--.
    Line 39, "realiability." should read --reliability.--.

COLUMN 9

Line 47, "form" should read --forms--.

COLUMN 13

Line 10, "it" should read --its--.

Signed and Sealed this

Twenty-seventh Day of April, 1993

Attest:

MICHAEL K. KIRK

*Attesting Officer*      *Acting Commissioner of Patents and Trademarks*